United States Patent
Nam et al.

(10) Patent No.: US 12,474,756 B2
(45) Date of Patent: Nov. 18, 2025

(54) ELECTRONIC DEVICES INCLUDING POWER MANAGEMENT CIRCUIT

(71) Applicant: SAMSUNG ELECTRONICS CO., LTD., Suwon-si (KR)

(72) Inventors: Hyunseok Nam, Suwon-si (KR); Hyunwook Song, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 201 days.

(21) Appl. No.: 18/510,498

(22) Filed: Nov. 15, 2023

(65) Prior Publication Data
US 2024/0402785 A1     Dec. 5, 2024

(30) Foreign Application Priority Data

May 31, 2023    (KR) ........................ 10-2023-0069671

(51) Int. Cl.
| | |
|---|---|
| *G06F 1/3203* | (2019.01) |
| *H02H 5/04* | (2006.01) |
| *H02H 7/12* | (2006.01) |
| *H02M 1/00* | (2006.01) |
| *H02M 1/32* | (2007.01) |

(Continued)

(52) U.S. Cl.
CPC ............. *G06F 1/3203* (2013.01); *H02H 5/04* (2013.01); *H02H 7/1213* (2013.01); *H02M 1/0067* (2021.05); *H02M 1/32* (2013.01); *H02M 1/327* (2021.05); *H02M 3/156* (2013.01); *H02M 3/1584* (2013.01)

(58) Field of Classification Search
CPC .......... G06F 1/3203; G06F 1/206; G06F 1/28; G06F 1/30; H02H 5/04; H02H 7/1213; H02M 1/0067; H02M 1/32; H02M 1/327; H02M 3/156; H02M 3/1584; H02M 1/009; H02M 1/0003; H02M 1/0048; H02M 3/00; H02M 1/0083; Y02D 10/00

See application file for complete search history.

(56) References Cited

U.S. PATENT DOCUMENTS 7,454,640 B1    11/2008   Wong
7,777,554 B2 *   8/2010   Hirano ................... G01K 1/026
                                              327/512

(Continued)

FOREIGN PATENT DOCUMENTS

CN        109888717       6/2019

*Primary Examiner* — Yusef A Ahmed
(74) *Attorney, Agent, or Firm* — Fish & Richardson P.C.

(57) ABSTRACT

An example electronic device includes a power management circuit (PMIC), a plurality of voltage devices, and a time division sensing circuit. The PMIC includes a plurality of direct current (DC)-DC converters that generate a plurality of power supply voltages, respectively, based on a battery voltage. The voltage devices are distributed in the PMIC, and generate a plurality of temperature voltages that are inversely proportional to an ambient temperature. The time division sensing circuit converts the temperature voltages to sensed voltages, generates a decision signal indicating that at least one of the plurality of sensed voltages is equal to or smaller than a reference voltage based on a result of comparing each of the sensed voltages with the reference voltage by a time division scheme during a sensing period, and provides the decision signal to the PMIC. The PMIC performs a thermal shutdown on at least one of the DC-DC converters.

20 Claims, 18 Drawing Sheets

(51) Int. Cl.
*H02M 3/156* (2006.01)
*H02M 3/158* (2006.01)

(56) References Cited

U.S. PATENT DOCUMENTS

| | | | | |
|---|---|---|---|---|
| 8,710,810 B1* | 4/2014 | McJimsey | ............. | H02M 3/158 323/283 |
| 9,355,705 B2* | 5/2016 | Furutani | .................. | G11C 8/12 |
| 10,608,539 B1* | 3/2020 | Huang | .................... | H02J 1/102 |
| 11,880,533 B1* | 1/2024 | Chen | ..................... | H02M 3/158 |
| 2004/0176859 A1* | 9/2004 | Chian | ....................... | H02J 7/34 700/12 |
| 2010/0013304 A1* | 1/2010 | Heineman | ............... | H02J 1/001 307/31 |
| 2010/0013305 A1* | 1/2010 | Heineman | ............... | H02J 1/001 307/31 |
| 2010/0117450 A1* | 5/2010 | Azrai | ................. | H02M 1/0009 307/31 |
| 2013/0128405 A1 | 5/2013 | Lee | | |
| 2014/0210445 A1* | 7/2014 | Hasegawa | ........... | H02M 3/1588 323/284 |
| 2018/0191333 A1* | 7/2018 | Chen | ........................ | H03K 7/08 |
| 2018/0337599 A1* | 11/2018 | Chen | ..................... | H02M 3/158 |
| 2019/0056697 A1* | 2/2019 | Liu | ........................... | G04F 5/14 |
| 2020/0333818 A1* | 10/2020 | Yun | ........................ | G11C 5/147 |
| 2021/0036596 A1* | 2/2021 | Jeon | ..................... | H02M 3/156 |
| 2021/0408969 A1* | 12/2021 | Bang | ...................... | H03F 3/245 |
| 2022/0069696 A1* | 3/2022 | Takegami | ............. | H02M 1/007 |
| 2022/0069712 A1* | 3/2022 | Mondal | ............... | H02M 1/0009 |
| 2022/0103064 A1 | 3/2022 | Sun | | |
| 2022/0276694 A1* | 9/2022 | Kim | ......................... | G06F 1/324 |
| 2022/0286054 A1* | 9/2022 | Park | ..................... | G06F 13/4282 |
| 2023/0009061 A1* | 1/2023 | Shim | ...................... | G11C 16/30 |
| 2023/0155506 A1* | 5/2023 | Nomiyama | ......... | H02M 1/0095 323/259 |
| 2023/0252926 A1* | 8/2023 | Hong | .................. | H02M 1/0009 345/211 |
| 2023/0336082 A1* | 10/2023 | Dai | ........................ | H02M 1/327 |
| 2024/0297588 A1* | 9/2024 | Potlapalli | ............ | H02M 1/327 |
| 2025/0216880 A1* | 7/2025 | Lee | ......................... | G05F 1/571 |

* cited by examiner

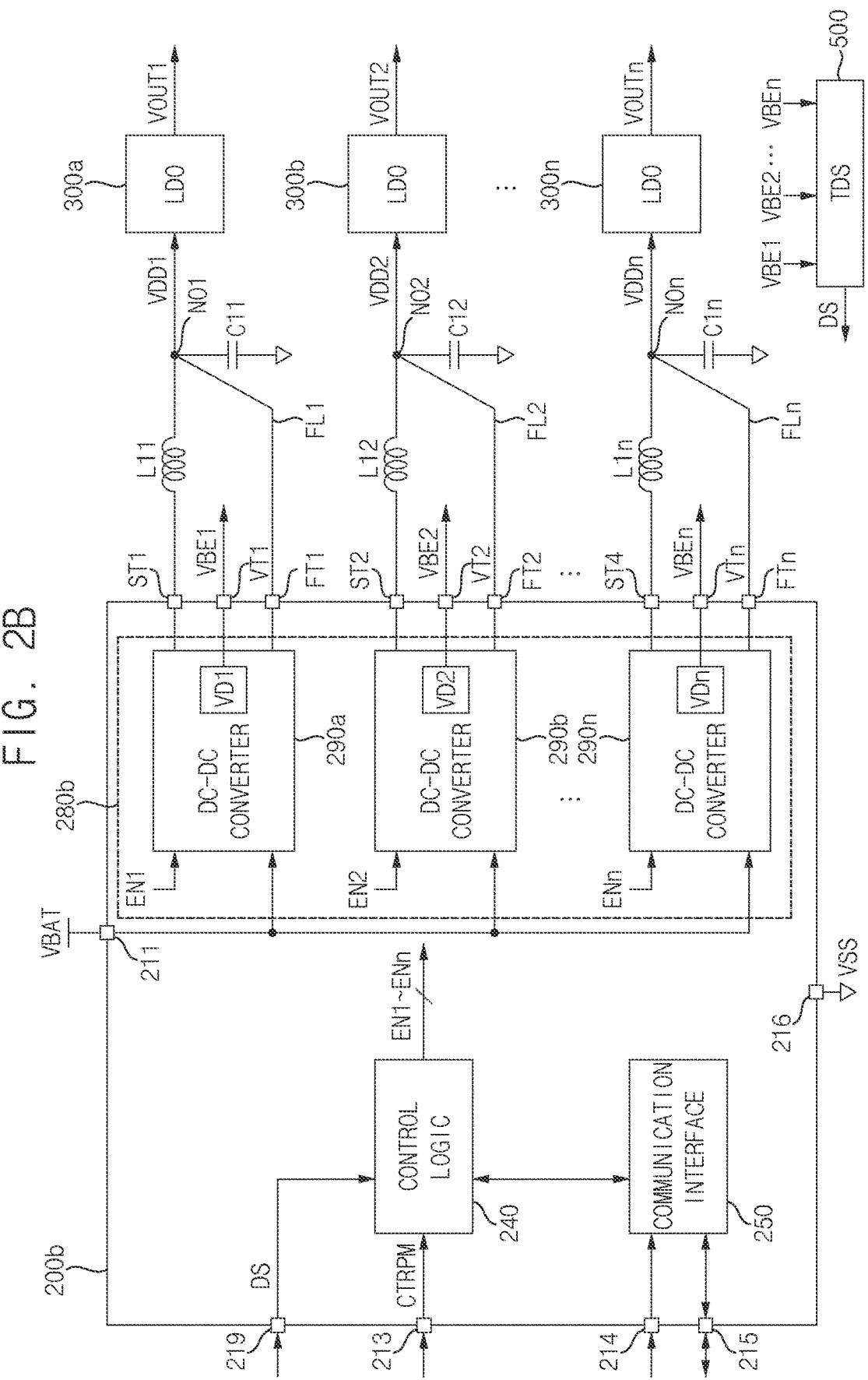

FIG. 10
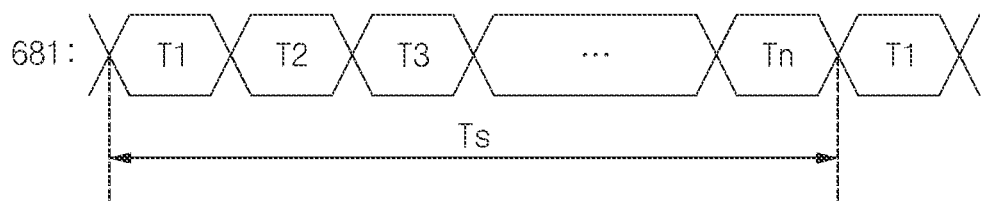
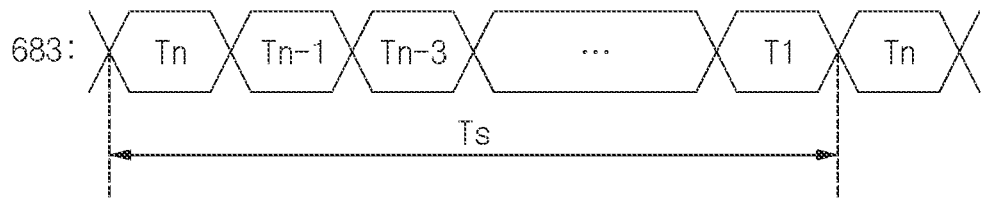

ELECTRONIC DEVICES INCLUDING POWER MANAGEMENT CIRCUIT

CROSS-REFERENCE TO RELATED APPLICATION

This application claims benefit of priority under 35 USC § 119 to Korean Patent Application No. 10-2023-0069671, filed on May 31, 2023, in the Korean Intellectual Property Office, the disclosure of which is incorporated herein by reference in its entirety.

TECHNICAL FIELD

The present disclosure relates to electronic devices, and more particularly, to electronic devices performing thermal shutdown.

BACKGROUND

A system-on-chip (SoC) is a technology in which the sub-systems of a computer or like electronic system are provided as an integrated circuit (IC) on a single die, i.e., in which a single chip contains the subsystems of a computer or like electronic system. The SoC operates based on a power from a power management integrated circuit (PMIC) through a power rail, and it is important to reduce a size of the PMIC.

SUMMARY

The present disclosure relates to an electronic device capable of performing thermal shutdown with reduced size and capable of reducing power consumption.

In some implementations, an electronic device includes a power management circuit (PMIC), a plurality of voltage devices, and a time division sensing circuit. The PMIC includes a plurality of direct current (DC)-DC converters that generate a plurality of power supply voltages based on a battery voltage. The plurality of voltage devices are disposed and distributed in the PMIC, and the plurality of voltage devices generate a plurality of temperature voltages that are inversely proportional to ambient temperatures. The time division sensing circuit converts the plurality of temperature voltages to a plurality of sensed voltages, generates a decision signal indicating that at least one of the plurality of sensed voltages is equal to or smaller than a reference voltage based on a result of comparing each of the plurality of sensed voltages with the reference voltage by a time division scheme during a sensing period, and provides the decision signal to the PMIC. The PMIC performs a thermal shutdown on at least one of the plurality of DC-DC converters in response to the decision signal indicating that at least one of the plurality of sensed voltages is equal to or smaller than the reference voltage.

In some implementations, an electronic device includes a power management circuit (PMIC), a plurality of voltage devices, and a time division sensing circuit. The PMIC includes a plurality of direct current (DC)-DC converters that generate a plurality of power supply voltages based on a battery voltage. The plurality of voltage devices are disposed and distributed in the PMIC, and the plurality of voltage devices generate a plurality of temperature voltages that are inversely proportional to ambient temperatures. The time division sensing circuit converts the plurality of temperature voltages to a plurality of sensed voltages, generates a first sub decision signal by comparing each of the plurality of sensed voltages with a reference voltage by a first time division scheme during a sensing period, generates a second sub decision signal by comparing each of the plurality of sensed voltages with the reference voltage by a second time division scheme during the sensing period, generates a decision signal indicating that at least one of the plurality of sensed voltages is equal to or smaller than the reference voltage based on the first sub decision signal and the second sub decision signal and provides the decision signal to the PMIC. The PMIC performs a thermal shutdown on at least one of the plurality of DC-DC converters in response to the decision signal indicating that at least one of the plurality of sensed voltages is equal to or smaller than the reference voltage.

In some implementations, an electronic device includes a power management circuit (PMIC), a plurality of voltage devices, and a time division sensing circuit. The PMIC includes a plurality of direct current (DC)-DC converters that generate a plurality of power supply voltages based on a battery voltage. The plurality of voltage devices are disposed and distributed in the PMIC, and the plurality of voltage devices generate a plurality of temperature voltages that are inversely proportional to ambient temperatures. The time division sensing circuit converts the plurality of temperature voltages to a plurality of sensed voltages, generates a decision signal indicating that at least one of the plurality of sensed voltages is equal to or smaller than a reference voltage based on a result of comparing each of the plurality of sensed voltages with the reference voltage by a time division scheme during a sensing period, and provides the decision signal to the PMIC. The PMIC performs a thermal shutdown on at least one of the plurality of DC-DC converters in response to the decision signal indicating that at least one of the plurality of sensed voltages is equal to or smaller than the reference voltage. The plurality of voltage devices include ones of a plurality of bipolar junction transistors BJTs and a plurality of diodes. Each of the plurality of BJTs or each of the plurality of diodes is disposed in respective one of the plurality of DC-DC converters or disposed adjacent to respective one of the plurality of DC-DC converters. The time division sensing circuit includes a plurality of sensing units, a multiplexer, a comparator, a latch, and a controller. The plurality of sensing units convert the plurality of temperature voltages to the plurality of sensed voltages, respectively. The multiplexer provides a selected voltage by sequentially selecting the plurality of sensed voltages in response to first timing control signals. The comparator generates a comparison signal by comparing the selected voltage with the reference voltage. The latch provides the decision signal by latching the comparison signal based on second timing control signals. The controller generates the first timing control signals and the second timing control signals based on a clock signal.

Accordingly, in the electronic device according to example implementations, the voltage devices having a small size are disposed in the PMIC and the time division sensing circuit is disposed separately from the PMIC. The time division sensing circuit receives the temperature voltages from the voltage devices, converts the temperature voltages to the sensed voltages, compares each of the sensed voltages with the reference voltage based on a time division scheme, and provides the PMIC with the decision signal indicating an ambient temperature of at least one of the voltage devices is equal to or greater than the reference voltage. The PMIC performs a thermal shutdown on at least one of the DC-DC converters with reduced size while reducing power consumption.

BRIEF DESCRIPTION OF THE DRAWINGS

The above and other features of the present disclosure will become more apparent by describing in detail example implementations thereof with reference to the accompanying drawings.

FIG. 2B illustrates another example of a PMIC and LDO regulators in the computing system of FIG. 1.

FIG. 10 illustrates an example operation of a sub sensing circuit and a second sub sensing circuit in the time division sensing circuit in FIG. 9.

DETAILED DESCRIPTION

Figure 1:
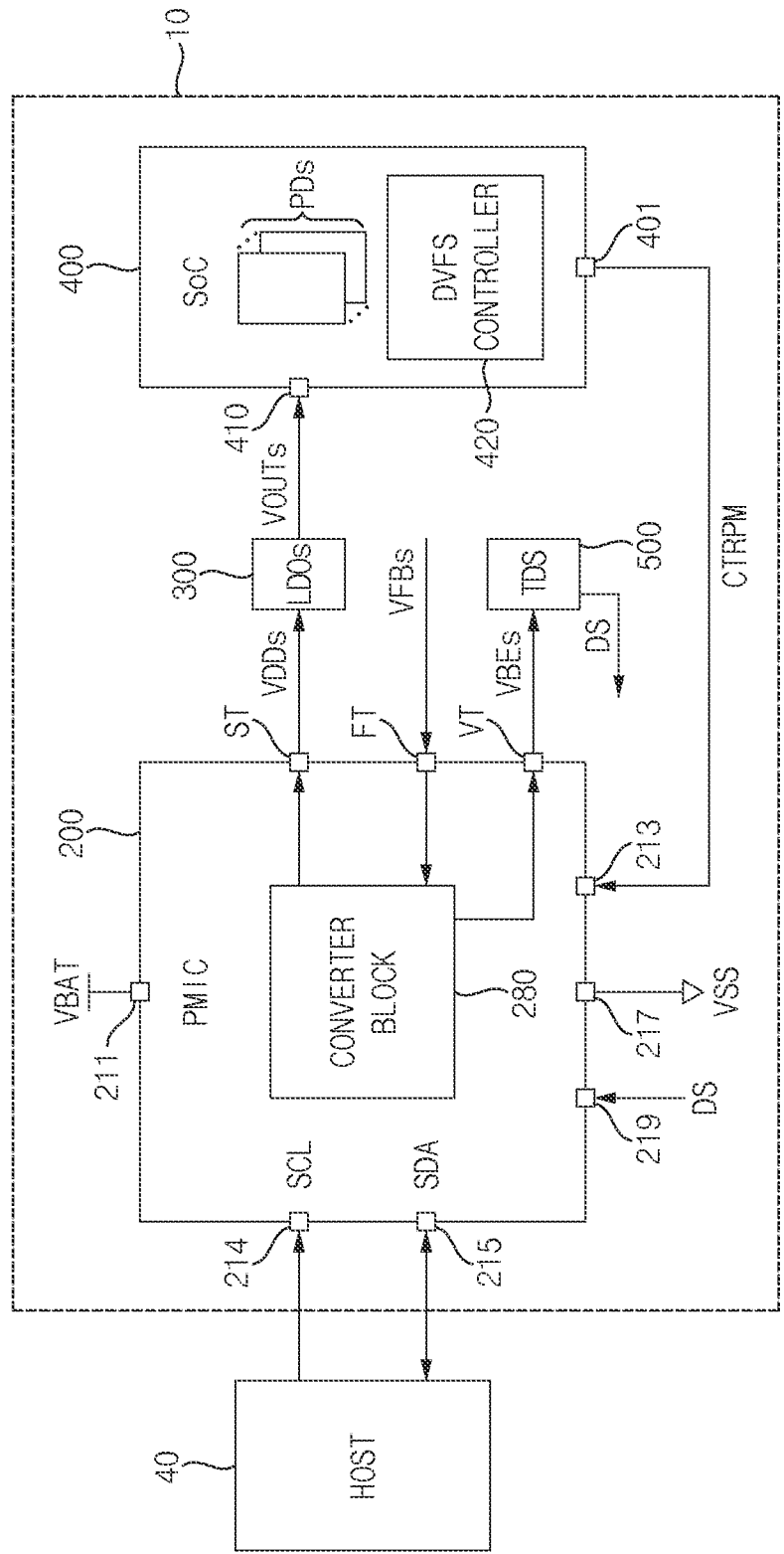
FIG. 1 is a block diagram illustrating an example of a computing system.

The present disclosure will be described more fully hereinafter with reference to the accompanying drawings. Like reference numerals may refer to like elements throughout the accompanying drawings.

FIG. 1 is a block diagram illustrating an example of a computing system.

Referring to FIG. 1, a computing system 5 may include a host 40 and an electronic device 10, and the electronic device 10 may include a power management integrated circuit (PMIC) 200, a plurality of low drop-out (LDO) regulators LDOs 300, a system-on-chip (SoC) 400, and a time division sensing circuit TDS 500.

The electronic device 10 may be implemented with any computing device or any mobile/portable device, such as a mobile phone, a smart phone, a tablet computer, a laptop computer, a personal digital assistants (PDA), an enterprise digital assistant (EDA), a portable multimedia player (PMP), a digital camera, a portable game console, a music player, a camcorder, a video player, a navigation device, a wearable device, an internet of things (IoT) device, an internet of everything (IoE) device, an e-book, a virtual reality (VR) device, an augmented reality (AR) device, a robotic device, etc.

The host 40 may be a master device that may communicate with the PMIC 200. For example, the host 40 may drive a serial clock line SCL and a serial data line SDA between the host 40 and the PMIC 200 in compliance with a given communication protocol, such as a serial peripheral interface (SPI) protocol, an inter-integrated circuit (I2C) protocol, or an I3C protocol. The host 40 may transmit an SCL signal (clock signal) to the PMIC 200 through the SCL and may transmit an SDA signal (data signal) synchronized with the SCL signal to the PMIC 200 through the SDA.

The host 40 may initiate communication by driving an SCL terminal 214 to a first logical state (e.g., logic high) and driving an SDA terminal 215 from the first logical state to a second logical state (e.g., logic low). The host 40 may transmit the SDA signal including address bits of the PMIC 200 and an R/W bit indicating a read operation or a write operation, to the PMIC 200. The host 40 may receive the SDA signal including an acknowledge (ACK) bit from the PMIC 200. The host 40 may check (or determine) whether the address bits and the R/W bit are successfully transmitted to the PMIC 200, by using the ACK bit.

The PMIC 200 may be a slave device that may communicate with the host 40. The PMIC 200c may include the SCL terminal 214 that is connected to the SCL and receives the SCL signal and the SDA terminal 215 that is connected to the SDA and receives the SDA signal or outputs the SDA signal.

The PMIC 200 may include an input voltage terminal 211 receiving a battery voltage VBAT, a ground voltage terminal 217 receiving a ground voltage V SS, a switching pin ST providing power supply voltages VDDs and a feedback pin FT receiving feedback voltages VFBs.

The PMIC 100 may further include a converter block 280 that generates a plurality of power supply voltages VDDs based on the battery voltage VBAT and provides the power supply voltages VDDs to the LDO regulators 300. The converter block 280 may include a plurality of direct current (DC)-DC converters and each of the plurality of DC-DC converters may generate corresponding one of the power supply voltages VDDs.

The PMIC 100 may further include a plurality of voltage devices (VD1, VD2, . . . , VDn in FIG. 2A) which are disposed and distributed in the PMIC 100. Each of the plurality of voltage devices may be disposed in each of the plurality of DC-DC converters or may be disposed adjacent to each of the plurality of DC-DC converters. Here, n is a natural number greater than two. The plurality of voltage devices may generate a plurality of temperature voltages VBE1, VBE2, . . . , VBEn that are inversely proportional to ambient temperatures and may provide the temperature voltages VBE1, VBE2, . . . , VBEn to the time division sensing circuit 500 through voltage terminals VT1, VT2, . . . , VTn.

The time division sensing circuit 500 may convert the plurality of temperature voltages VBE1, VBE2, . . . , VBEn to a plurality of sensed voltages, may generate a decision signal DS indicating that at least one of the plurality of sensed voltages is equal to or smaller than a reference voltage based on a result of comparing each of the plurality of sensed voltages with the reference voltage by a time division scheme during a sensing period and may provide decision signal DS to the PMIC 200.

The PMIC 200 may receive the decision signal DS through a terminal 219 and may to perform a thermal shutdown on at least one of the plurality of DC-DC converters in response to the decision signal DS indicating that at least one of the plurality of sensed voltages is equal to or smaller than the reference voltage.

The plurality of LDO regulators 300 may generate a plurality of output voltages VOUTs based on the plurality of power supply voltages VDDs and may provide the plurality of output voltages VOUTs to power domains PDs in the SoC 400 through voltage terminals 410 of the SoC 400.

Feedback voltage VFBs may be voltages corresponding to the power supply voltages VDDs that are fed back to the PMIC 200 after the power supply voltages VDDs are supplied to the LDO regulators 300. For example, the power supply voltages VDDs may be directly provided to the PMIC 200c, and each level of the feedback voltages VFBs may be the same as a level of corresponding one of the power supply voltages VDDs.

On the other hand, the power supply voltages VDDs may be indirectly provided to the PMIC 200. For example, the power supply voltages VDDs may be provided to the PMIC 200 through a voltage divider or a filter circuit including passive components (e.g., a resistor, a capacitor, an inductor, and so on.). In this case, the voltage divider or the filter circuit may be placed on a substrate on which the PMIC 200 and the SoC 400 are mounted. In this case, each level of the feedback voltages VFBs may be different from as a level of corresponding one of the power supply voltages VDDs.

The SoC may provide a power control management control signal CTRPM for controlling the PMIC 200 and may provide the power control management control signal CTRPM to the PMIC 200 through a general purpose input/output terminal (GPIO) terminal 401. The PMIC 200 may receive the power control management control signal CTRPM through a GPIO terminal 213.

Figure 2A:
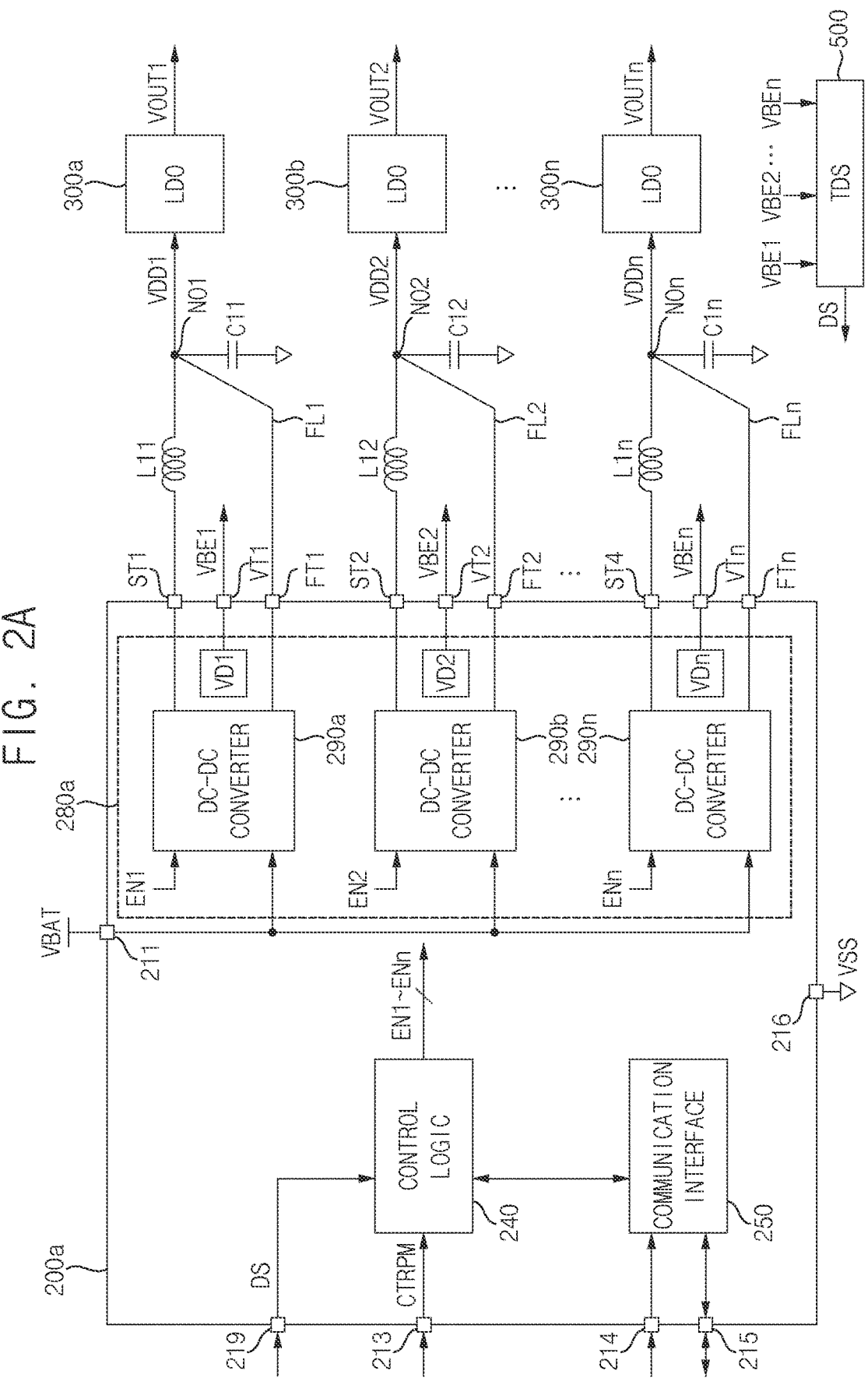
FIG. 2A illustrates an example of a PMIC and low drop-out (LDO) regulators in the computing system of FIG. 1.

FIG. 2A illustrates an example of a PMIC and LDO regulators in the computing system of FIG. 1.

In FIG. 2A, a plurality of LDO regulators 300a, 300b, . . . , 300n are illustrated and represent the LDO regulators 300 in FIG. 1.

Referring to FIGS. 1 and 2A, a PMIC 200a may include an input voltage terminal 211, a GPIO terminal 213, switching terminals ST1, ST2, . . . , STn, feedback terminals FT1, FT2, . . . , FTn, a ground voltage terminal 216, an SCL terminal 214, an SDA terminal 215, a control logic 240, a communication interface 250 and a converter block 280a and a plurality of voltage devices VD1, VD2, . . . , VDn. The converter block 280a may include a plurality of DC-DC converters 290a, 290b, . . . , 290n.

Each of the DC-DC converters 290a, 290b, . . . , 290n may be connected to respective one of the switching terminals ST1, ST2, . . . , STn and may provide respective one of the power supply voltages VDD1, VDD2, . . . , VDDn to respective one of output nodes NO1, NO2, . . . , NOn through respective one of the switching terminals ST1, ST2, . . . , STn. Each of the DC-DC converters 290a, 290b, . . . , 290n may be connected to respective one of the feedback terminals FT1, FT2, . . . , FTn and may receive respective one of the power supply voltages VDD1, VDD2, . . . , VDDn through respective one of feedback lines FL1, FL2, . . . , FLn connected to respective one of the feedback terminals FT1, FT2, . . . , FTn.

Each of the voltage devices VD1, VD2, . . . , VDn may be disposed adjacent to respective one of the DC-DC converters 290a, 290b, . . . , 290n, may generate respective one of the temperature voltages VBE1, VBE2, . . . , VBEn which are inversely proportional to ambient temperature and may provide the time division sensing circuit 500 with the respective one of the temperature voltages VBE1, VBE2, . . . , VBEn through respective one of the voltage terminals VT1, VT2, . . . , VTn.

The time division sensing circuit 500 may convert the plurality of temperature voltages VBE1, VBE2, . . . , VBEn to a plurality of sensed voltages, may generate the decision signal DS indicating that at least one of the plurality of sensed voltages is equal to or smaller than a reference voltage based on a result of comparing each of the plurality of sensed voltages with the reference voltage by a time division scheme during a sensing period and may provide decision signal DS to the control logic 240 through a terminal 209.

An electronic device of FIG. 2A may further include inductors L11, L12, . . . , L1n and output capacitors C11, C12, . . . , C1n. Each of the inductors L11, L12, . . . , L1n may be coupled between respective one of the switching terminals ST1, ST2, . . . , STn and respective one of output nodes NO1, NO2, . . . , NOn. Each of the output capacitors C11, C12, . . . , C1n may be coupled between respective one of the output nodes NO1, NO2, . . . , NOn and the ground voltage VSS.

The control logic 240 may receive the power management control signal CTRPM from the SoC 400 through the GPIO 213 and may control each of the DC-DC converters 290a, 290b, . . . , 290n based on the power management control signal CTRPM.

The control logic 240 may control activation and deactivation of each of the DC-DC converters 290a, 290b, . . . , 290n based on the power management control signal CTRPM. The control logic 240 may generate a plurality of enable signals EN1, EN2, . . . , ENn based on the power management control signal CTRPM, and may provide each of the enable signals EN1, EN2, . . . , ENn to respective one of the DC-DC converters 290a, 290b, . . . , 290n to control activation and deactivation of each of the DC-DC converters 290a, 290b, . . . , 290n.

In addition, the control logic 240 may receive the decision signal DS and may perform a thermal shutdown on at least one of the plurality of DC-DC converters 290a, 290b, . . . , 290n in response to the decision signal DS indicating that at least one of the plurality of sensed voltages is equal to or smaller than the reference voltage. When the decision signal DS indicates that at least one of the plurality of sensed voltages is equal to or smaller than the reference voltage, it is noticeable that at least one ambient temperature is equal to or greater than a reference temperature.

The control logic 240 may perform the thermal shutdown on at least one of the plurality of DC-DC converters 290a, 290b, . . . , 290n by reducing a voltage level output from at least one of the DC-DC converters 290a, 290b, . . . 290n or by deactivating at least one of the DC-DC converters 290a, 290b, . . . , 290n in response to the decision signal DS indicating that at least one of the plurality of sensed voltages is equal to or smaller than the reference voltage The communication interface 250 may be connected to the host 40 through the SCL terminal 214 and the SDA terminal 215, may exchange data with the host 40 and may exchange signals with the control logic 260.

Each of the LDO regulators 300a, 300b, . . . , 300n may receive respective one of the power supply voltages VDD1, VDD2, . . . , VDDn and may generate respective one of output voltages VOUT1, VOUT2, . . . , VOUTn based on respective one of the power supply voltages VDD1, VDD2, . . . , VDDn.

FIG. 2B illustrates another example of a PMIC and LDO regulators in the computing system of FIG. 1.

In FIG. 2B, a plurality of LDO regulators 300a, 300b, . . . , 300n are illustrated and represent the LDO regulators 300 in FIG. 1.

Referring to FIGS. 1 and 2B, a PMIC 200b may include an input voltage terminal 211, a GPIO terminal 213, switching terminals ST1, ST2, . . . , STn, feedback terminals FT1, FT2, . . . , FTn, a ground voltage terminal 216, an SCL terminal 214, an SDA terminal 215, a control logic 240, a communication interface 250 and a converter block 280a. The converter block 280a may include a plurality of DC-DC converters 290a, 290b, . . . , 290n and a plurality of voltage devices VD1, VD2, . . . , VDn. Each of the voltage devices VD1, VD2, . . . , VDn may be disposed in respective one of the DC-DC converters 290a, 290b, . . . , 290n.

The PMIC 200b in FIG. 2B differs from the PMIC 200a in FIG. 2A in that each of the voltage devices VD1, VD2, . . . , VDn may be disposed in respective one of the DC-DC converters 290a, 290b, . . . , 290n, and thus description repeated with FIG. 2B will be omitted.

Figure 3:
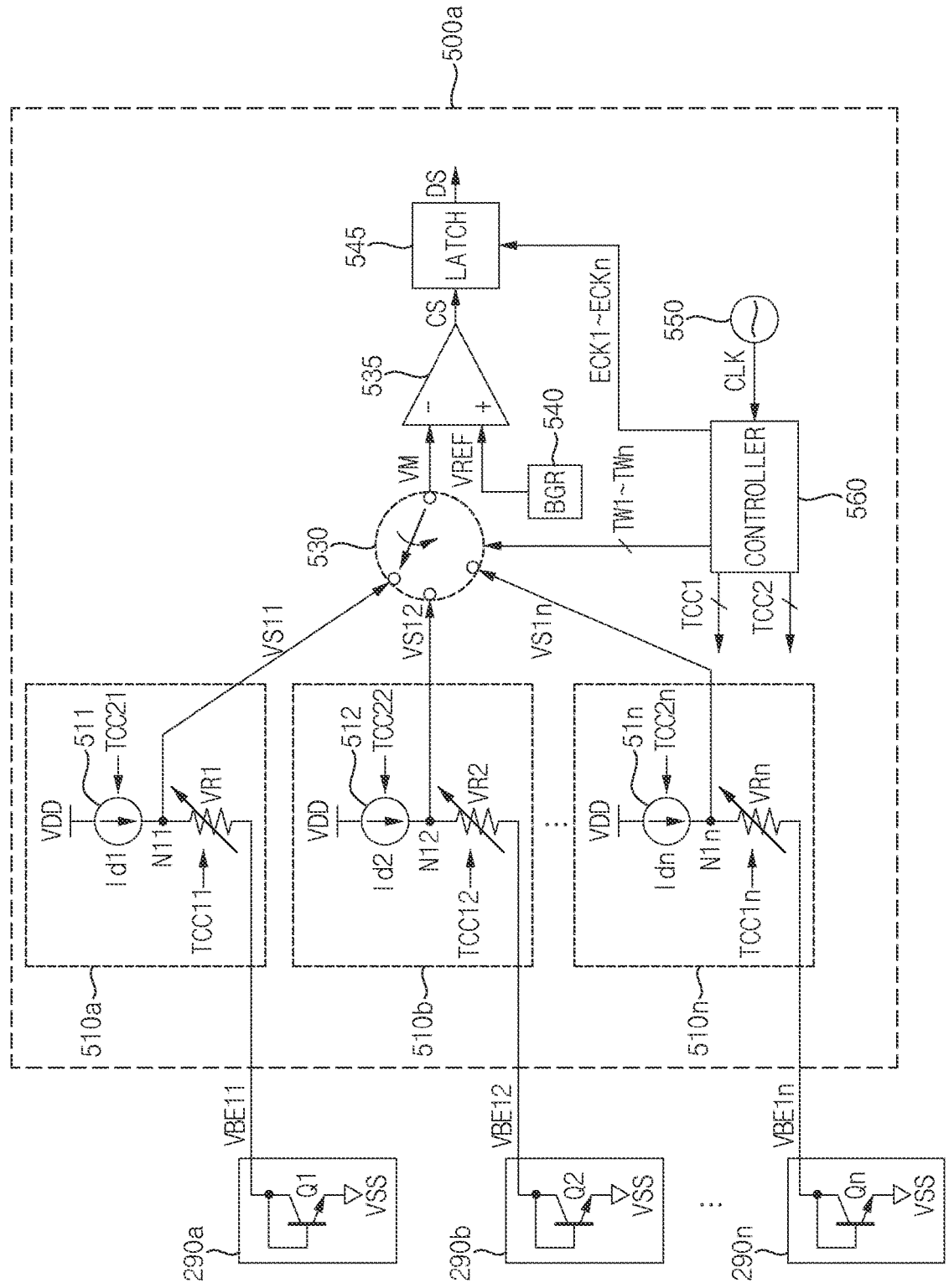
FIG. 3 is a circuit diagram illustrating an example of an electronic device of FIG. 1.

FIG. 3 is a circuit diagram illustrating an example of an electronic device of FIG. 1.

In FIG. 3, the plurality of DC-DC converters 290a, 290b, . . . , 290n in FIG. 2A or FIG. 2B are altogether illustrated for convenience of explanation and each of the plurality of DC-DC converters 290a, 290b, . . . , 290n may include respective one of a plurality of BJTs Q1, Q2, . . . , Qn therein. The plurality of BJTs Q1, Q2, . . . , Qn may correspond to the plurality of voltages devices VD1, VD2, . . . , VDn in FIG. 2A or FIG. 2B.

Although it is illustrated as each of the plurality of BJTs Q1, Q2, . . . , Qn is included in respective one of the plurality of DC-DC converters 290a, 290b, . . . , 290n, each of the plurality of BJTs Q1, Q2, . . . , Qn may be disposed adjacent to respective one of the plurality of DC-DC converters 290a, 290b, . . . , 290n.

Referring to FIG. 3, each of the BJTs Q1, Q2, . . . , Qn may include an emitter coupled to the ground voltage VSS, a collector which is coupled to a time division sensing circuit 500a and provides a corresponding temperature voltage from among a plurality of temperature voltage VBE11, VBE12, . . . , VBE1n, and a base coupled to the collector.

Because the collector and the base of each of the BJTs Q1, Q2, . . . , Qn are coupled to each other, each of the BJTs Q1, Q2, . . . , Qn may provide a complementary to absolute temperature (CTAT) voltage as the corresponding temperature voltage at the collector.

The time division sensing circuit 500a may include a plurality of sensing units 510a, 510b, . . . , 510n, a multiplexer 530, a comparator 535, a latch 545, a reference voltage generator BGR, 540, an oscillator 550 and a controller 560. Each of the plurality of sensing units 510a, 510b, . . . , 510n may be also referred to as a sensing circuit.

The plurality of sensing units 510a, 510b, . . . , 510n may receive the temperature voltage VBE11, VBE12, . . . , VBE1n, may convert the temperature voltage VBE11, VBE12, . . . , VBE1n to a plurality of sensed voltages VS11, VS12, . . . , VS1n and may provide the sensed voltages VS11, VS12, . . . , VS1n to the multiplexer 530. That is, each of the sensing units 510a, 510b, . . . , 510n may receive respective one of the temperature voltage VBE11, VBE12, . . . , VBE1n, and may convert the each of temperature voltage VBE11, VBE12, . . . , VBE1n to respective one of the sensed voltages VS11, VS12, . . . , VS1n.

The sensing unit 510a from among the plurality of sensing units 510a, 510b, . . . , 510n may include a current source 511 and a variable resistor VR1. The current source 511 may be coupled between a power supply voltage VDD and a first node N11 and may provide a reference current Id1 to the first node N11. The variable resistor VR1 may include a first terminal coupled to the first node N11 and a second terminal receiving the temperature voltage VBE11. The sensing unit 510a may provide the multiplexer 530 with a voltage corresponding to sum of the temperature voltage VBE11 and a result of multiplication of the reference current Id1 and a resistance value of the variable resistor VR1 as the sensed voltage VS11.

The sensing unit 510b from among the plurality of sensing units 510a, 510b, . . . , 510n may include a current source 512 and a variable resistor VR2. The current source 512 may be coupled between the power supply voltage VDD and a first node N12 and may provide a reference current Id2 to the first node N12. The variable resistor VR2 may include a first terminal coupled to the first node N12 and a second terminal receiving the temperature voltage VBE12. The sensing unit 510b may provide the multiplexer 530 with a voltage corresponding to sum of the temperature voltage VBE12 and a result of multiplication of the reference current Id2 and a resistance value of the variable resistor VR2 as the sensed voltage VS12.

The sensing unit 510n from among the plurality of sensing units 510a, 510b, . . . , 510n may include a current source 51n and a variable resistor VRn. The current source 51n may be coupled between the power supply voltage VDD and a first node N1n and may provide a reference current Idn to the first node N1n. The variable resistor VRn may include a first terminal coupled to the first node N1n and a second terminal receiving the temperature voltage VBE1n. The sensing unit 510n may provide the multiplexer 530 with a voltage corresponding to sum of the temperature voltage VBE1n and a result of multiplication of the reference current Idn and a resistance value of the variable resistor VRn as the sensed voltage VS1n.

The multiplexer 530 may receive the sensed voltages VS11, VS12, . . . , VS1n and may provide a selected voltage VM by sequentially selecting the sensed voltages VS11, VS12, . . . , VS1n based on first timing control signals TW1~TWn.

The comparator 535 may provide a comparison signal CS to the latch 545 by comparing the selected voltage VM with the reference voltage VREF. The comparator 535 may have a positive input terminal to receive the reference voltage VREF, a negative input terminal to receive the selected voltage VM and an output terminal to provide the comparison signal CS. When at least one of the sensed voltages VS11, VS12, . . . , VS1n, which is provided as the selected voltage VM, is equal to or smaller than the reference voltage VREF, the comparison signal CS may transition to a logic high level from a logic low level.

The latch 545 may output the decision signal DS by latching the comparison signal CS based on second timing control signals ECK1~ECKn.

The reference voltage generator 540 may generate the reference voltage VREF independent of the temperature and may provide the reference voltage VREF to the comparator 535.

The oscillator 550 may generate a clock signal CLK and may provide the clock signal CLK to the controller 560.

The controller 560 may generate the first timing control signals TW1~TWn and the second timing control signals ECK1~ECKn, may provide the first timing control signals TW1~TWn to the multiplexer 530, and may provide the second timing control signals ECK1~ECKn to the latch 545.

Each of the first timing control signals TW1~TWn may have a first activation interval and each of the second timing control signals ECK1~ECKn may have a second activation interval smaller than the first activation interval.

In addition, the controller 560 may provide each of first trimming control codes TCC11, TCC12, . . . , TCC1n to respective one of the variable resistors VR1, VR2, . . . , VRn and may provide each of second trimming control codes TCC21, TCC22, . . . , TCC2n to respective one of the current sources 511, 512, . . . , 51n. The first trimming control codes TCC11, TCC12, . . . , TCC1n may be represented as first trimming control codes TCC1 and the second trimming control codes TCC21, TCC22, . . . , TCC2n may be represented as first trimming control codes TCC1.

Each of the first trimming control codes TCC11, TCC12, . . . , TCC1n may be associated with compensating for mismatch of resistance value of respective one of the variable resistors VR1, VR2, . . . , VRn due to process variance of the variable resistors VR1, VR2, . . . , VRn and thus, each of the sensed voltage VS11, VS12, . . . , VS1n may have a voltage which is inversely proportional to the temperature.

Each of the second trimming control codes TCC21, TCC22, . . . , TCC2n may be associated with compensating for mismatch of the reference currents Id1, Id2, . . . , Idn due to process variance of the current sources 511, 512, . . . 51n and thus, each of the sensed voltage VS11, VS12, . . . , VS1n may have a voltage which is inversely proportional to the temperature.

Figure 4:
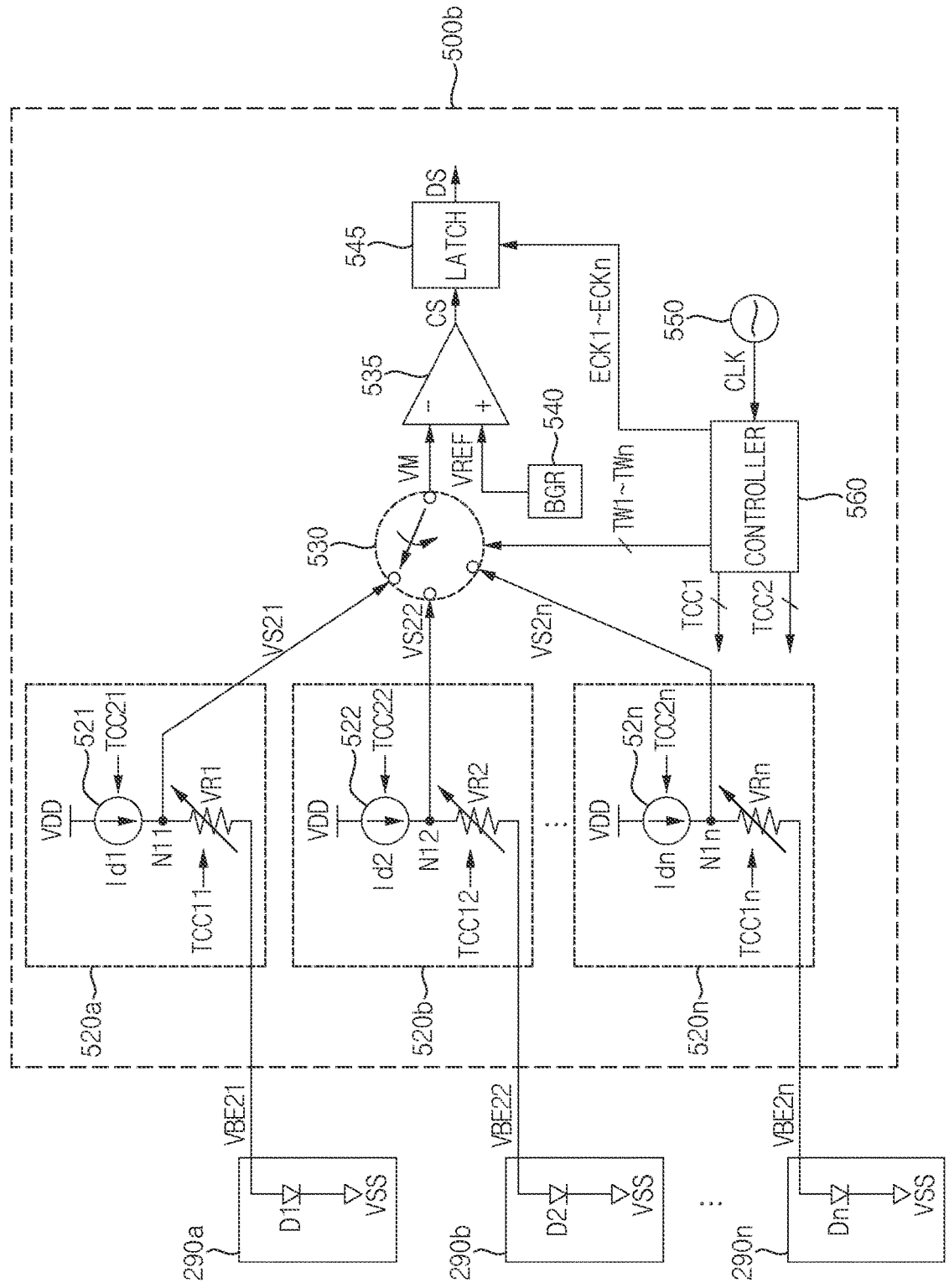
FIG. 4 is a circuit diagram illustrating another example of an electronic device of FIG. 1.

FIG. 4 is a circuit diagram illustrating another example of an electronic device of FIG. 1.

In FIG. 4, the plurality of DC-DC converters 290a, 290b, . . . , 290n in FIG. 2A or FIG. 2B are altogether illustrated for convenience of explanation and each of the plurality of DC-DC converters 290a, 290b, . . . , 290n may include respective one of a plurality of diodes D1, D2, . . . , Dn therein. The plurality of diodes D1, D2, . . . , Dn may correspond to the plurality of voltages devices VD1, VD2, . . . , VDn in FIG. 2A or FIG. 2B.

Although it is illustrated as each of the plurality of diodes D1, D2, . . . , Dn is included in respective one of the plurality of DC-DC converters 290a, 290b, . . . , 290n, each of the plurality of diodes D1, D2, . . . , Dn may be disposed adjacent to respective one of the plurality of DC-DC converters 290a, 290b, . . . , 290n.

Referring to FIG. 4, each of the diodes D1, D2, . . . , Dn may include a cathode coupled to the ground voltage VSS and an anode which is coupled to a time division sensing circuit 500b and provides a corresponding temperature voltage from among a plurality of temperature voltage VBE11, VBE12, . . . , VBE1n.

When a current flowing through each of the diodes D1, D2, . . . , Dn, a voltage of the anode decreases as the ambient temperature increases. Therefore, each of the diodes D1, D2, . . . , Dn may provide a CTAT voltage as the corresponding temperature voltage at the anode.

The time division sensing circuit 500b may include a plurality of sensing units 520a, 520b, . . . , 520n, a multiplexer 530, a comparator 535, a latch 545, a reference voltage generator 540, an oscillator 550 and a controller 560.

The plurality of sensing units 520a, 520b, . . . , 520n may receive the temperature voltage VBE21, VBE22, . . . , VBE2n, may convert the temperature voltage VBE21, VBE22, . . . , VBE2n to a plurality of sensed voltages VS21, VS22, . . . , VS2n and may provide the sensed voltages VS21, VS22, . . . , VS22n to the multiplexer 530. That is, each of the sensing units 520a, 520b, . . . , 520n may receive respective one of the temperature voltage VBE21, VBE22, . . . , VBE2n, may convert the each of temperature voltage VBE21, VBE22, . . . , VBE2n to respective one of the sensed voltages VS21, VS22, . . . , VS2n.

The time division sensing circuit 500b in FIG. 4 differs from the time division sensing circuit 500a in FIG. 3 in that the plurality of sensing units 520a, 520b, . . . , 520n may receive the temperature voltage VBE21, VBE22, . . . , VBE2n, may convert the temperature voltage VBE21, VBE22, . . . , VBE2n to a plurality of sensed voltages VS21, VS22, . . . , VS2n and may provide the sensed voltages VS21, VS22, . . . , VS22n to the multiplexer 530. Therefore, descriptions repeated with FIG. 3 will be omitted.

Figure 5:
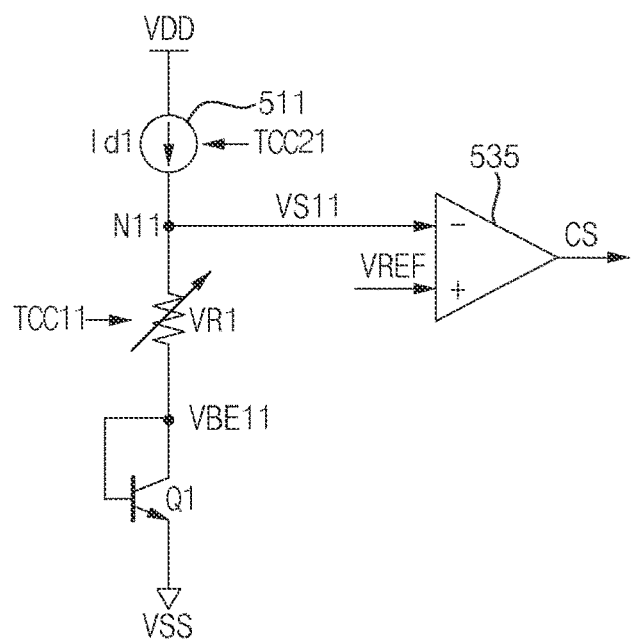
FIG. 5 illustrates an example sensing unit and an example comparator in a time division sensing circuit in FIG. 3.

FIG. 5 illustrates an example sensing unit and an example comparator in a time division sensing circuit in FIG. 3.

Referring to FIG. 5, the sensing unit 510a may include a current source 511 and a variable resistor VR1. The current source 511 may be coupled between a power supply voltage VDD and a first node N11 and may provide a reference current Id1 to the first node N11. The variable resistor VR1 may include a first terminal coupled to the first node N11 and a second terminal receiving the temperature voltage VBE11. The sensing unit 510a may provide the multiplexer 530 with a voltage corresponding to sum of the temperature voltage VBE11 and a result of multiplication of the reference current Id1 and a resistance value of the variable resistor VRI as the sensed voltage VS11.

The comparator 535 may output the comparison signal CS by comparing the sensed voltage VS11 with the reference voltage VREF. The comparator 535 may output comparison signal CS transitioning to a logic high level from a logic low level when a voltage level of the sensed voltage VS11 becomes equal to or smaller than the reference voltage VREF.

Figure 6:
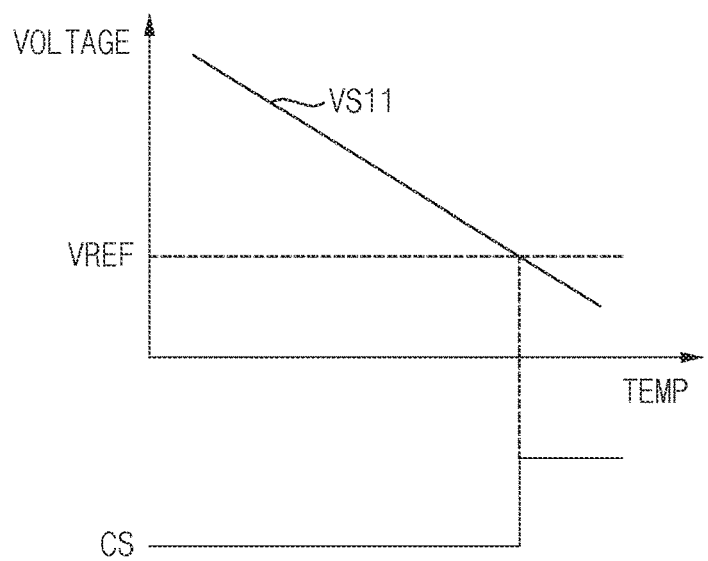
FIG. 6 illustrates an example operation of the comparator in FIG. 5.

FIG. 6 illustrates an example operation of the comparator in FIG. 5.

Referring to FIGS. 5 and 6, a voltage level of the sensed voltage VS11 decreases linearly as the ambient temperature denoted by TEMP increases. The comparator 535 may output comparison signal CS transitioning to a logic high level from a logic low level when a voltage level of the sensed voltage VS11 becomes equal to or smaller than the reference voltage VREF.

Figure 7:
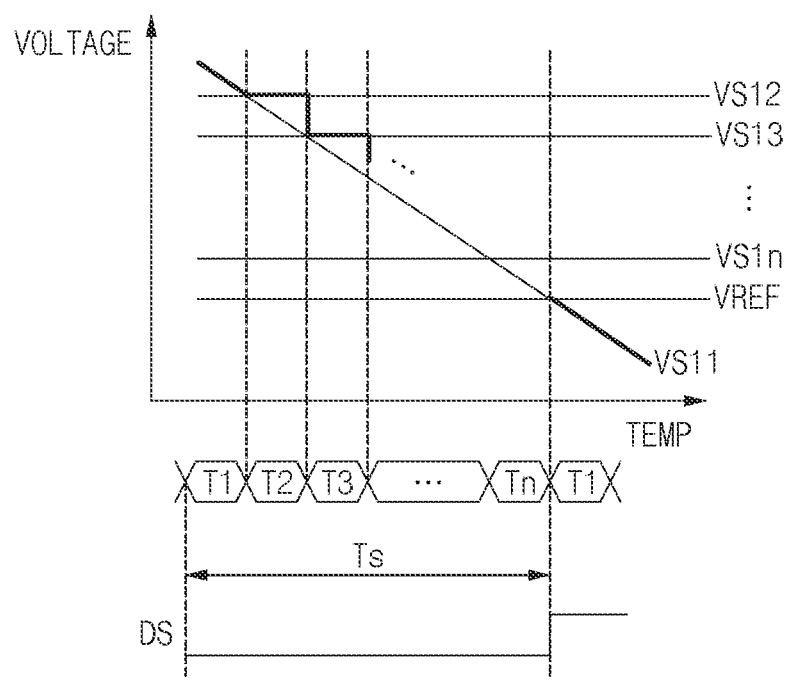
FIG. 7 illustrates an example operation of a multiplexer and an example decision signal in the time division sensing circuit in FIG. 3.

FIG. 7 illustrates an example operation of a multiplexer and an example decision signal in the time division sensing circuit in FIG. 3.

Referring to FIGS. 3 and 7, the controller 560 may divide a sensing period Ts into a plurality of sub sensing periods T1, T2, T3, . . . , Tn, activate each of the first timing control signals TW1~TWn and each of the second timing control signals ECK1~ECKn in each of the plurality of sub sensing periods T1, T2, T3, . . . , Tn, provide the first timing control signals TW1~TWn to the multiplexer 530, and provide the second timing control signals ECK1~ECKn to the latch 545.

The multiplexer 530 may provide the selected voltage VM to the latch 545 by sequentially selecting the plurality of sensed voltages VS11, VS12, . . . , VS1n that decrease linearly in the first activation interval of each of the plurality of sub sensing periods T1, T2, T3, . . . , Tn.

Each of the sensed voltages VS11, VS12, . . . , VS1n may decease linearly as the ambient temperature increases. The comparator 535 may output the comparison signal CS transitioning to a logic high level from a logic low level when a voltage level of the sensed voltage VS11 becomes equal to or smaller than the reference voltage VREF, and the latch 545 may output the decision signal DS transitioning to a logic high level by latching the comparison signal CS transitioning to a logic high level.

Figure 8:
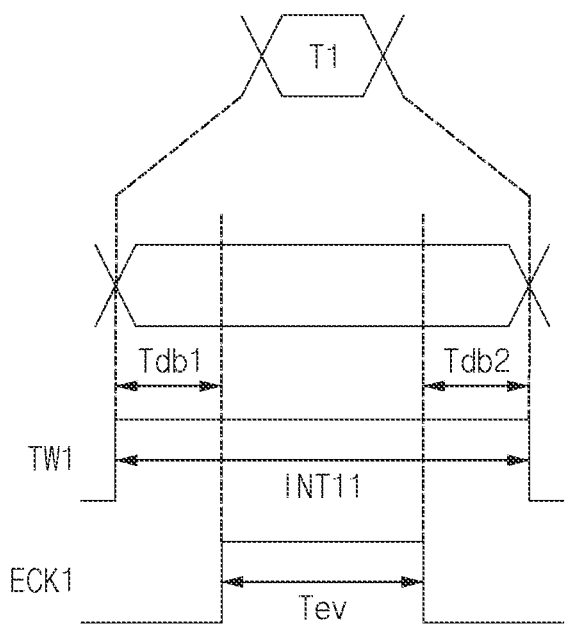
FIG. 8 illustrates in detail an example sub sensing period in FIG. 7.

FIG. 8 illustrates in detail an example sub sensing period in FIG. 7.

In FIG. 8, the sub sensing period T1 from among the plurality of sub sensing periods T1, T2, T3, . . . , Tn is illustrated in detail, and each of the sub sensing periods T2, T3, . . . , Tn may be substantially the same as the sub sensing period T1.

Referring to FIG. 8, the sub sensing period T1 may correspond to a first activation interval INT11 of the first timing control signal TW1, the second timing control signal ECK1 corresponding to the first timing control signal TW1 may have a second activation interval Tev smaller than the first activation interval INT11.

The controller 560 in FIG. 3 may determine the second activation interval Tev of the second timing control signal ECK1 by eliminating debounce periods Tdb1 and Tdb2 from the first activation interval INT11 such that the latch 545 operates stably.

The latch 545 may output the decision signal DS by latching the comparison signal CS in response to an edge of the second timing control signal ECK1.

Therefore, in the electronic device 10, the voltage devices VD1, VD2, . . . , VDn having a small size are disposed in the PMIC 200a or 200b and the time division sensing circuit 500 is disposed separately from the PMIC 200a or 200b. The time division sensing circuit 500 receives the temperature voltages VBE1, VBE2, . . . , VBEn from the voltage devices VD1, VD2, . . . , VDn, converts the temperature voltages VBE1, VBE2, . . . , VBEn to the sensed voltages VS11, VS12, . . . , VS1n, compares each of the sensed voltages VS11, VS12, . . . , VS1n with the reference voltage VREF based on a time division scheme, and provides the PMIC 200a or 200b with the decision signal DS indicating an ambient temperature of at least one of the voltage devices VD1, VD2, . . . , VDn is equal to or greater than the reference voltage. The PMIC 200a or 200b performs a thermal shutdown on at least one of the DC-DC converters 290a, 290b, . . . , 290n.

Accordingly, the electronic device 10 may detect a temperature of a substrate of a die on which the PMIC 200a or 200b is mounted without increasing occupied area and with low power consumption.

Figure 9:
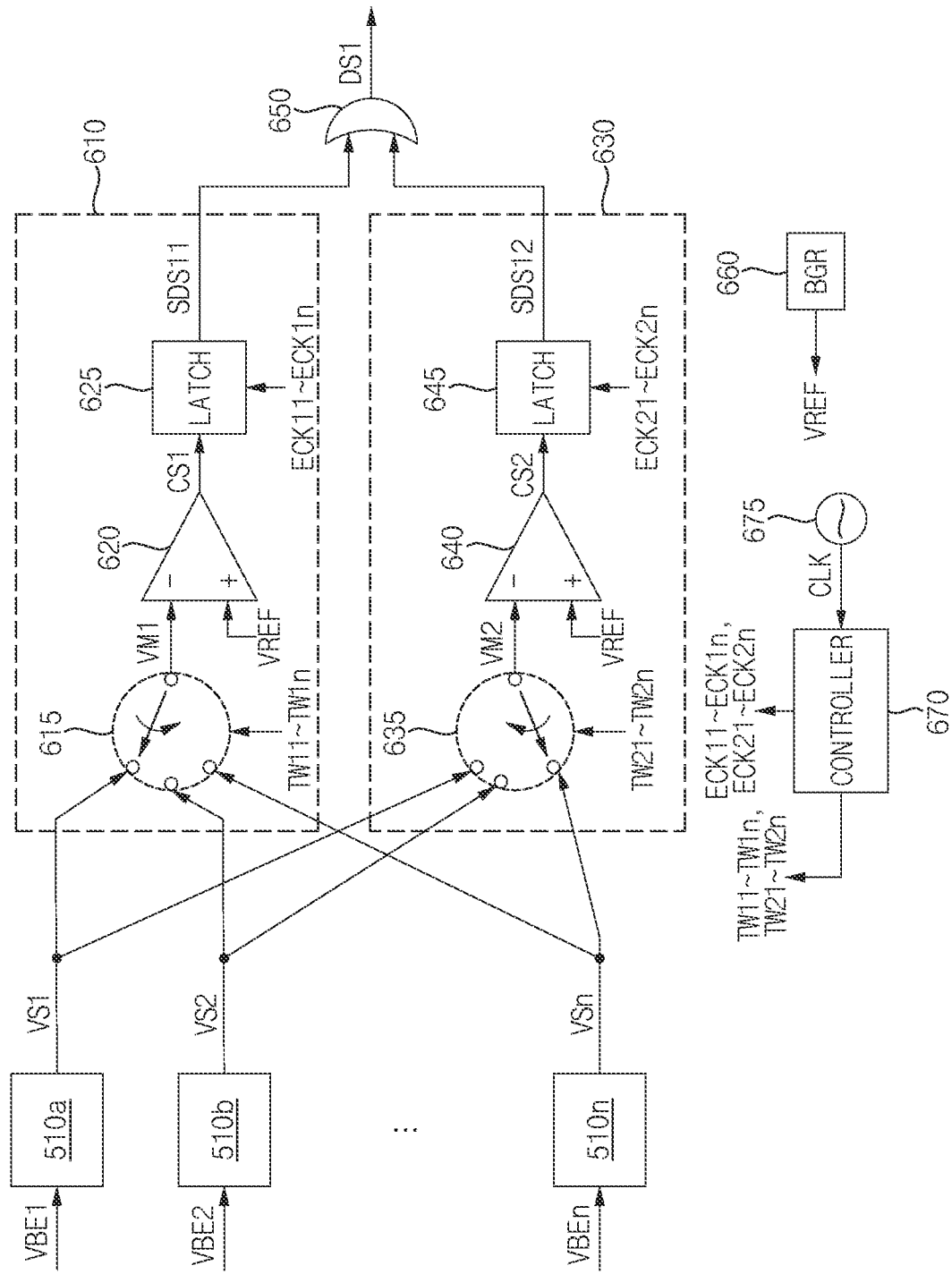
FIG. 9 is a block diagram illustrating an example of a time division sensing circuit.

FIG. 9 is a block diagram illustrating an example of a time division sensing circuit.

Referring to FIG. 9, a time division sensing circuit 500c may include a plurality of sensing units 510a, 510b, . . . , 510n, a first sub sensing circuit 610, a second sub sensing circuit 630, an OR gate 650, a reference voltage generator BGR, 660, an oscillator 675 and a controller 670.

The plurality of sensing units 510a, 510b, . . . , 510n may receive temperature voltage VBE1, VBE2, . . . , VBEn, may convert the temperature voltage VBE1, VBE2, . . . , VBEn to a plurality of sensed voltages VS1, VS2, . . . , VSn and may provide the sensed voltages VS1, VS2, . . . , VSn to the first sub sensing circuit 610 and the second sub sensing circuit 630. That is, each of the sensing units 510a, 510b, . . . , 510n may receive respective one of the temperature voltage VBE1, VBE2, . . . , VBEn, and may convert the each of temperature voltage VBE1, VBE2, . . . , VBEn to respective one of the sensed voltages VS1, VS2, . . . , VSn.

The first sub sensing circuit 610 may generate a first sub decision signal SDS11 by comparing each of the plurality of sensed voltages VS1, VS2, . . . , VSn with the reference voltage VREF by a first time division scheme during a sensing period and the second sub sensing circuit 630 may generate a second sub decision signal SDS12 by comparing each of the plurality of sensed voltages VS1, VS2, . . . , VSn with the reference voltage VREF by a second time division scheme during the sensing period. The OR gate 650 may generate a decision signal DS1 indicating that at least one of the plurality of sensed voltages VS1, VS2, . . . , VSn is equal to or smaller than the reference voltage VREF based on the first sub decision signal SDS11 and the second sub decision signal SDS12 and may provide the decision signal DS1 to the PMIC 200a in FIG. 2A or the PMIC 200b in FIG. 2B.

The reference voltage generator 660 may generate the reference voltage VREF independent of the temperature and may provide the reference voltage VREF to the first sub sensing circuit 610 and the second sub sensing circuit 630.

The oscillator 675 may generate a clock signal CLK and may provide the clock signal CLK to the controller 670.

The controller 670 may generate first timing control signals TW11~TW1n, second timing control signals ECK11~ECK1n, third timing control signals TW21~TW2n and fourth timing control signals ECK21~ECK2n based on the clock signal CLK, may provide the first timing control signals TW11~TW1n, the second timing control signals ECK11~ECK1n to the first sub sensing circuit 610 and may provide the third timing control signals TW21~TW2n and the fourth timing control signals ECK21~ECK2n to the second sub sensing circuit 630.

Each of the first timing control signals TW11~TW1n may have a first activation interval and each of the second timing control signals ECK11~ECK1n may have a second activation interval smaller than the first activation interval. Each of the third timing control signals TW21~TW2n may have the first activation interval and each of the fourth timing control signals ECK21~ECK2n may have the second activation interval.

The first sub sensing circuit 610 may include a first multiplexer 615, a first comparator 620 and a first latch 625.

The first multiplexer 615 may receive the sensed voltages VS1, VS2, . . . , VSn and may provide a first selected voltage VM1 by sequentially selecting the sensed voltages VS1, VS2, . . . , VSn by a first order based on the first timing control signals TW11~TW1n.

The first comparator 620 may provide a first comparison signal CSI to the first latch 625 by comparing the first selected voltage VMI with the reference voltage VREF. The first comparator 620 may have a positive input terminal to receive the reference voltage VREF, a negative input terminal to receive the first selected voltage VM1 and an output terminal to provide the first comparison signal CS1. When at least one of the sensed voltages VS1, VS2, . . . , VSn, which is provided as the first selected voltage VM1, is equal to or smaller than the reference voltage VREF, the first comparison signal CS1 may transition to a logic high level from a logic low level.

The first latch 625 may output the first sub decision signal SDS1 by latching the first comparison signal CS1 based on the second timing control signals ECK11~ECK1n.

The second sub sensing circuit 630 may include a second multiplexer 635, a second comparator 640 and a second latch 645.

The second multiplexer 635 may receive the sensed voltages VS1, VS2, . . . , VSn and may provide a second selected voltage VM2 by sequentially selecting the sensed voltages VS1, VS2, . . . , VSn by a second order opposite to the first order based on the third timing control signals TW21~TW2n.

The second comparator 640 may provide a second comparison signal CS2 to the second latch 645 by comparing the second selected voltage VM2 with the reference voltage VREF. The second comparator 640 may have a positive input terminal to receive the reference voltage VREF, a negative input terminal to receive the second selected voltage VM2 and an output terminal to provide the second comparison signal CS2. When at least one of the sensed voltages VS1, VS2, . . . , VSn, which is provided as the second selected voltage VM2, is equal to or smaller than the reference voltage VREF, the second comparison signal CS2 may transition to a logic high level from a logic low level.

The second latch 645 may output the second sub decision signal SDS2 by latching the second comparison signal CS2 based on the fourth timing control signals ECK21~ECK2n.

The OR gate 650 may output the decision signal DS1 by performing an OR operation on the first sub decision signal SDS1 and the second sub decision signal SDS2.

FIG. 10 illustrates an example operation of a sub sensing circuit and a second sub sensing circuit in the time division sensing circuit in FIG. 9.

Referring to FIGS. 9 and 10, the first multiplexer 615 in the first sub sensing circuit 610 may sequentially select the plurality of sensed voltages VS1, VS2, . . . , VSn by the first order based on the first timing control signals TW11~TW1n in the first activation interval of each of the plurality of sub sensing periods T1, T2, T3, . . . , Tn as a reference numeral 681 indicates and the second multiplexer 635 in the second sub sensing circuit 630 may sequentially select the plurality of sensed voltages VS1, VS2, . . . , VSn by the second order opposite to the first order based on the third timing control signals TW21~TW2n in the first activation interval of each of the plurality of sub sensing periods Tn, Tn-1, Tn-2, . . . , T1 as a reference numeral 683 indicates.

Therefore, the time division sensing circuit 500c when compared with the time division sensing circuit 500a in FIG. 3 or the time division sensing circuit 500b in FIG. 4 may reduce a period about by half, which is associated with detecting a time point at which the ambient temperature becomes equal to or greater than the reference temperature, because the first sub sensing circuit 610 and the second sub sensing circuit 630 generate the first sub decision signal SDS1 and the second sub decision signal SDS2, respectively, by sequentially electing the plurality of sensed voltages VS1, VS2, . . . , VSn with an non-overlapping order.

Figure 11:
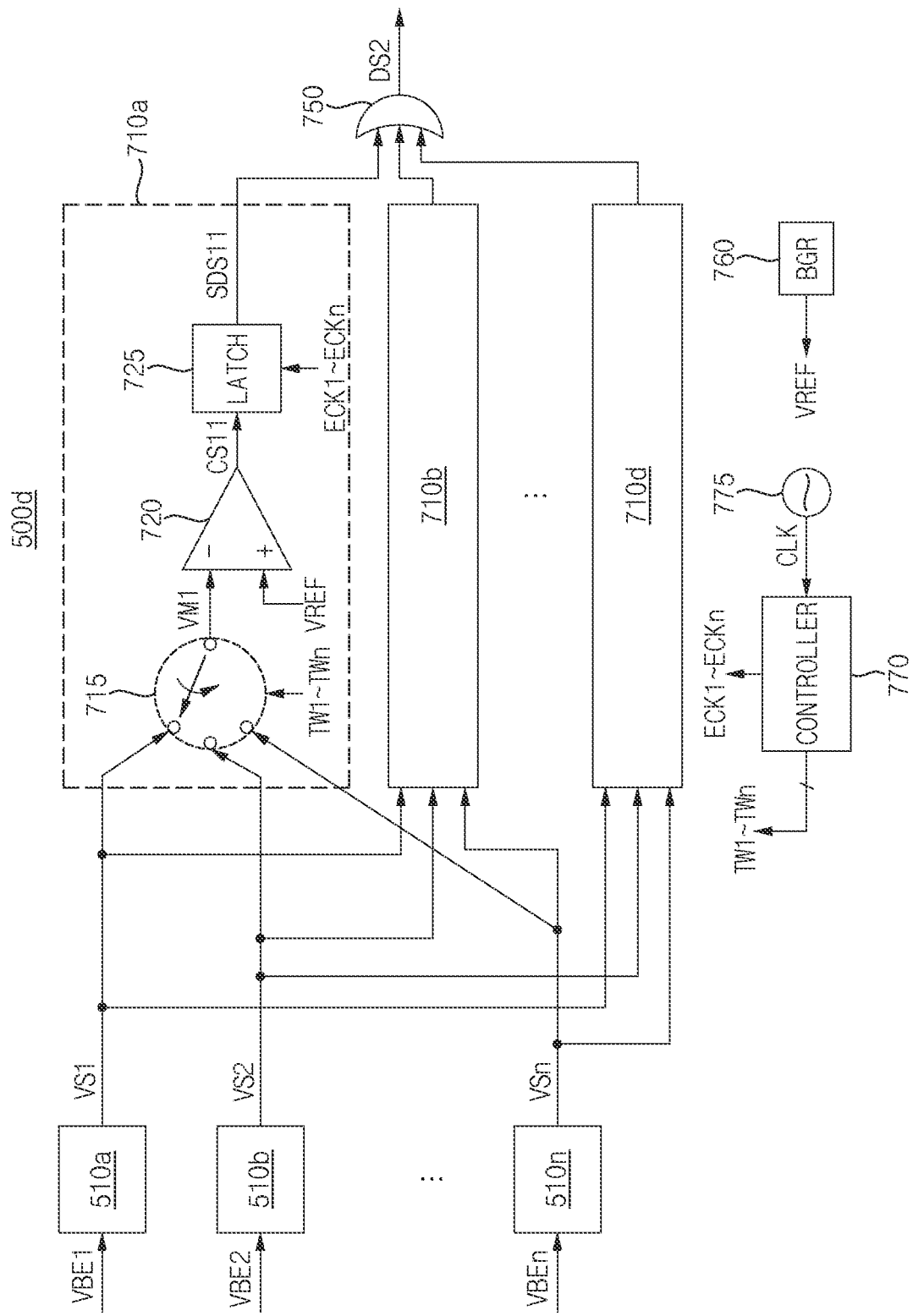
FIG. 11 is a block diagram illustrating another example of a time division sensing circuit.

FIG. 11 is a block diagram illustrating another example of a time division sensing circuit.

Referring to FIG. 11, a time division sensing circuit 500d may include a plurality of sensing units 510a, 510b, . . . , 510n, a plurality of sub sensing circuits 710a, 710b, . . . , 710d, an OR gate 750, a reference voltage generator BGR 760, an oscillator 775 and a controller 770.

The plurality of sensing units 510a, 510b, . . . , 510n may receive temperature voltage VBE1, VBE2, . . . , VBEn, may convert the temperature voltage VBE1, VBE2, . . . , VBEn to a plurality of sensed voltages VS1, VS2, . . . , VSn and may provide the sensed voltages VS1, VS2, . . . , VSn to the plurality of sub sensing circuits 710a, 710b, . . . , 710d. That is, each of the sensing units 510a, 510b, . . . , 510n may receive respective one of the temperature voltage VBE1, VBE2, . . . , VBEn, and may convert the each of temperature voltage VBE1, VBE2, . . . , VBEn to respective one of the sensed voltages VS1, VS2, . . . , VSn.

Each of the plurality of sub sensing circuits 710a, 710b, . . . , 710d may generate respective one of a plurality of sub decision signals SDS21, SDS22, . . . , SDS2d by comparing the sensed voltages VS1, VS2, . . . , VSn with the reference voltage VREF with different orders and may provide the plurality of sub decision signals SDS21, SDS22, . . . , SDS2d to the OR gate 750.

The OR gate 750 may output a decision signal DS2 by performing an OR operation on the plurality of sub decision signals SDS21, SDS22, . . . , SDS2d.

The reference voltage generator 760 may generate the reference voltage VREF independent of the temperature and may provide the reference voltage VREF to the plurality of sub sensing circuits 710a, 710b, . . . , 710d.

The oscillator 775 may generate a clock signal CLK and may provide the clock signal CLK to the controller 770.

The controller 770 may generate first timing control signals TW1~TWn and second timing control signals ECK1~ECKn based on the clock signal CLK, may provide the first timing control signals TW1~TWn and the second timing control signals ECK1~ECKn to the plurality of sub sensing circuits 710a, 710b, . . . , 710d.

The controller 770 may generate the first timing control signals TW1~TWn and the second timing control signals ECK1~ECKn such that the first timing control signals TW1~TWn and the second timing control signals ECK1~ECKn are activated with different orders in each of the plurality of sub sensing circuits 710a, 710b, . . . , 710d.

The sub sensing circuit 710 may include a multiplexer 715, a comparator 720 and a latch 725.

The multiplexer 715 may receive the sensed voltages VS1, VS2, . . . , VSn and may provide a selected voltage VM11 by sequentially selecting the sensed voltages VS1, VS2, . . . , VSn by a first order based on the first timing control signals TW1~TWn.

The comparator 720 may provide a comparison signal CS11 to the latch 725 by comparing the selected voltage VM11 with the reference voltage VREF. The comparator 720 may have a positive input terminal to receive the reference voltage VREF, a negative input terminal to receive the selected voltage VM11 and an output terminal to provide the comparison signal CS11. When at least one of the sensed voltages VS1, VS2, . . . , VSn, which is provided as the selected voltage VM11, is equal to or smaller than the reference voltage VREF, the comparison signal CS11 may transition to a logic high level from a logic low level.

The latch 725 may output the sub decision signal SDS11 by latching the comparison signal CS11 based on the second timing control signals ECK1~ECKn.

Configuration and operation of each of the sub sensing circuits 710b, . . . , 710d may be substantially the same as configuration and operation of the sub sensing circuit 710a.

Therefore, the time division sensing circuit 500d when compared with the time division sensing circuit 500a in FIG. 3 or the time division sensing circuit 500b in FIG. 4 may reduce a period about by 1/d, which is associated with detecting a time point at which the ambient temperature becomes equal to or greater than the reference temperature, because the each of the sub sensing circuits 710a, 710b, . . . , 710d generates respective one of the sub decision signals SDS21, SDS22, . . . , SDS2d by sequentially electing the plurality of sensed voltages VS1, VS2, . . . , VSn with an non-overlapping order. Here, d corresponds to a number of the sub sensing circuits 710a, 710b, . . . , 710d.

Figure 12:
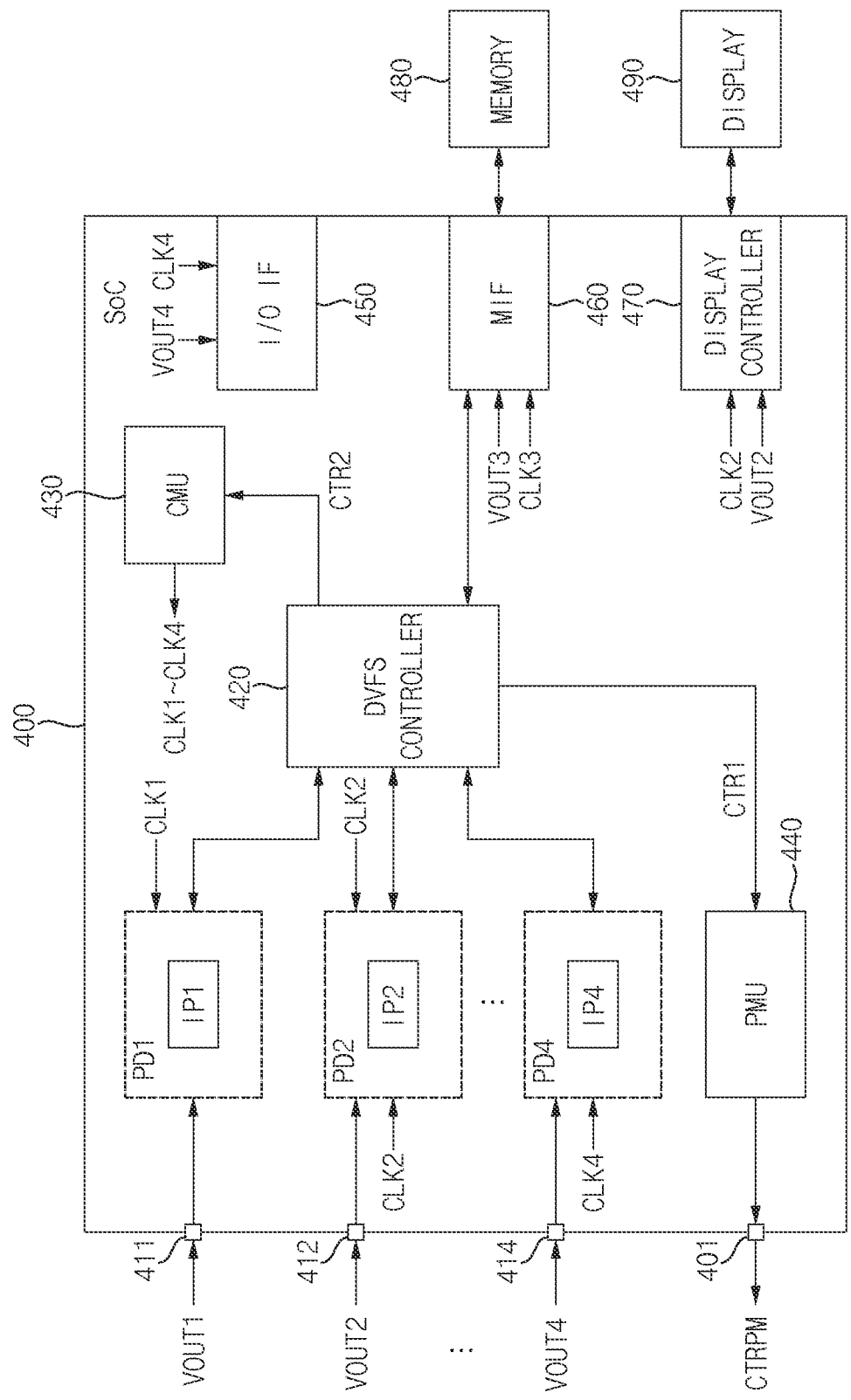
FIG. 12 is a block diagram illustrating an example of an SoC in an electronic device in FIG. 1.

FIG. 12 is a block diagram illustrating an example of an SoC in an electronic device in FIG. 1.

In FIG. 12, assuming that the SoC 400 includes a plurality of power domains PD1, PD2, . . . , PD4.

Referring to FIGS. 1 and 12, the SoC 400 may include voltage terminals 411, 412, . . . , 414, a GPIO terminal 401, a plurality of function blocks IP1, IP2, . . . , IP4 and a dynamic voltage and frequency scaling (DVFS) controller 420. In some implementations, the SoC 400 may further include a clock management unit (CMU) 430, a power management unit (PMU) 440, a memory interface (MIF) 460, an I/O interface (I/O IF) 450, and a display controller 470.

In some implementations, the SoC 400 may be an application processor (AP), a mobile AP, or the like.

The memory interface 460 may be connected to an external memory 480 and the display controller 470 may be connected to an external display 490.

Each of the plurality of function blocks IP1, IP2, . . . , IP4 may belong to respective one of different power domains PD1, PD2, . . . , PD4. One or more function blocks may belong to each of the power domains PD1, PD2, . . . , PD4.

Each of the output voltages VOUT1, VOUT2, . . . , VOUT4 may be supplied to respective one of the power domains PD1, PD2, . . . , PD4 through respective one of the voltage terminals 411, 412, . . . , 414 and each of clock signals CLK1~CLK4 may be provided to respective one of the power domains PD1, PD2, . . . , PD4 from the CMU 430. Each of the function blocks IP1, IP2, . . . , IP4 belonging to respective one of the power domains PD1, PD2, . . . , PD4 may operate based on respective one of the output voltages VOUTI, VOUT2, . . . , VOUT4 and respective one of the clock signals CLK1~CLK4.

The DVFS controller 420 may perform DVFS on the power domains PD1, PD2, . . . , PD4 by adjusting a frequency of each of the clock signals CLK1~CLK4 and/or a voltage level of each of the output voltages VOUT1, VOUT2, . . . , VOUT4. The DVFS technology represents a technology that dynamically controls or adjusts an operating frequency and an operating voltage of the SoC 400 to reduce power consumption.

The CMU 430 may generate the clock signals CLK1~CLK4 and may increase, maintain, or decrease the frequency of each of the clock signals CLK1~CLK4 based on a clock control signal CTR2 from the DVFS controller 420.

The PMU 440 may monitor the current power consumption of the SoC 400, may store the permitted power consumption of the SoC 400, and may compare the current power consumption with the permitted power consumption. The PMU 440 may generate the power control management control signal CTRPM for controlling the PMIC 200 based on a power control signal CTR1 and/or a result of the comparing operation, and may provide the power control management control signal CTRPM to the PMIC 200 through the GPIO terminal 401.

The memory interface 460 may control or facilitate data transfer between the SoC 400 and the memory 480. For example, the memory interface 460 may operate based on the clock signal CLK3 and the output voltage VOUT3. The memory interface 460 may belong to the third power domain.

The memory 480 may be disposed outside the SoC 400 and may exchange data with the SoC 400 via the memory interface 460. In some implementations, the memory 480 may include at least one volatile memory such as a dynamic random access memory (DRAM), a synchronous DRAM (SDRAM), a static random access memory (SRAM), etc., and/or at least one nonvolatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc. Alternatively, the memory 480 may include a solid state drive or solid state disk (SSD), an embedded SSD (eSSD), a multimedia card (MMC), an embedded MMC (eMMC), a universal flash storage (UFS), etc.

The I/O interface 450 may control or facilitate data transfer between the SoC 400 and an external system (not illustrated). In some implementations, the I/O interface 450 may support a serial advanced technology attachment (SATA), a SATA express (SATAe), a SAS (serial attached small computer system interface (SCSI)), a peripheral component interconnect-express (PCIe®), a nonvolatile memory express (NVMe), or a mobile industry processor interface (MIPI®).

The display controller 470 may control or facilitate data transfer between the SoC 400 and the display 490. The display 490 may be disposed outside the SoC 400 and may display image data form the SoC 400. For example, the display 490 may operate based on the clock signal CLK2 and the output voltage VOUT2. The display controller 470 may belong to the second power domain.

In some implementations, at least a part of the DVFS controller 420, the CMU 430 and the PMU 440 may be implemented as hardware. For example, at least a part of the DVFS controller 420, the CMU 430 and the PMU 440 may be implemented as instructions or program routines (e.g., a software program). For example, the instructions or the program routines may be stored in an internal storage (not illustrated) included in the SoC 400 or the memory 480 located outside the SoC 400.

Although not illustrated in FIG. 12, the SoC 400 may include a performance monitoring unit that measures or counts performance parameters of the function blocks IP1, IP2, . . . , IP4, the memory interface 460 and the display controller 470. For example, the performance parameters may include instruction cycles, workloads, cache hits, cache misses, branch misses, etc. The DVFS controller 420 may control the DVFS based on measuring result of the performance monitoring unit.

Figure 13:
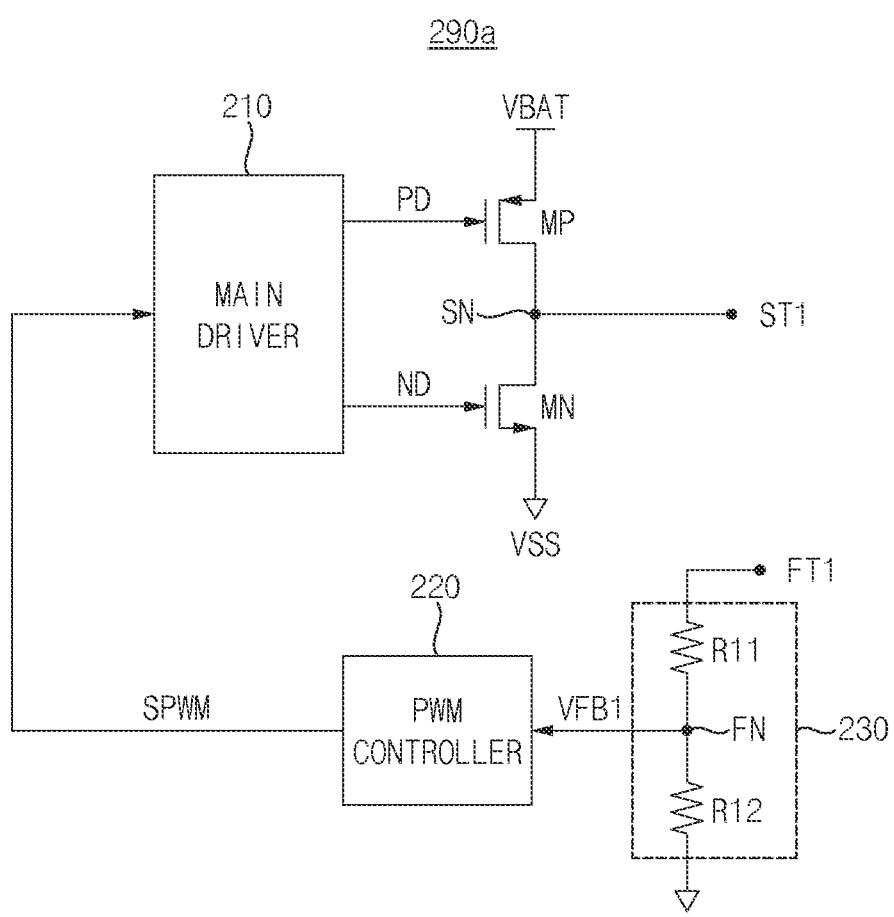
FIG. 13 is a block diagram illustrating an example DC-DC converter in the PMIC in FIG. 2A or in FIG. 2B.

FIG. 13 is a block diagram illustrating an example DC-DC converter in the PMIC in FIG. 2A or in FIG. 2B.

FIG. 13 illustrates a configuration of the DC-DC converter 290a and each configuration of the DC-DC converters 290b, . . . , 290n may be substantially the same as the configuration of the DC-DC converter 290a.

Referring to FIG. 13, the DC-DC converter 290a may include a main driver 210, a first power switch MP, a second power switch MN, a feedback circuit 230 and a pulse width modulation (PWM) controller 220.

The first power switch MP may be coupled between the battery voltage VBAT and a switching node SN connected to the switching terminal SNI and may include a PMOS transistor that has a source coupled to the battery voltage VBAT, a gate receiving a first driving control signal PD and a drain coupled to the switching node SN. The second power switch MN may be coupled between the switching node SN and a ground voltage VSS. The second power switch MP may include an NMOS transistor which has a drain coupled to the switching node SN, a gate receiving a second driving control signal ND and a source coupled to the ground voltage VSS.

The PWM controller 220 may generate a PWM signal SPWM based on a feedback voltage VFB1 which is proportional to the power supply voltage VDD1 in FIG. 2A. The PWM controller 220 may generate the PWM signal SPWM by performing a PWM on the feedback voltage VFB1.

The feedback circuit 230 may generate the feedback voltage VFB1 which is proportional to the power supply voltage VDD1 and may provide the feedback voltage VFB1 to the PWM controller 220. The feedback circuit 230 may include dividing resistors R11 and R12 connected between the feedback terminal FT1 and the ground voltage VSS and the dividing resistors R11 and R12 may be connected to each other at a feedback node FN.

For example, as illustrated in FIG. 13, the feedback circuit 230 may generate the feedback voltage VFB1 corresponding to a ratio of resistance values of the dividing resistors R11 and R12, but example implementations are not limited thereto.

As illustrated in FIG. 13, each of the DC-DC converters 290a, 290b, . . . , 290n may include a buck converter. The buck converter may receive the battery voltage VBAT and may generate a power supply voltage whose level is relatively smaller than the level of the battery voltage VBAT, based on the battery voltage VBAT.

Figure 14:
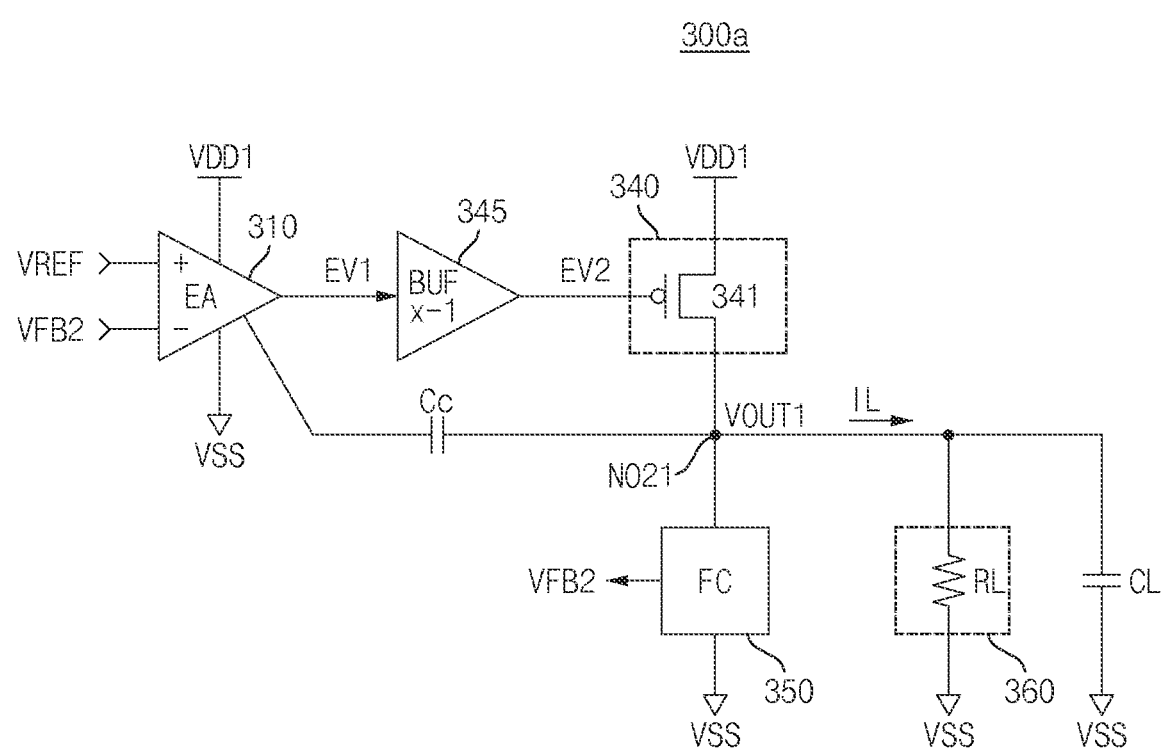
FIG. 14 is a block diagram illustrating an example LDO regulator in FIG. 2A or in FIG. 2B.

FIG. 14 is a block diagram illustrating an example LDO regulator in FIG. 2A or in FIG. 2B.

FIG. 14 illustrates a configuration of the LDO regulator 300a and each configuration of the LDO regulators 300b, . . . , 300n may be substantially the same as the configuration of the LDO regulator 300a.

Referring to FIG. 14, the LDO regulator 300a may include an error amplifier (EA) 310, a buffer (BUF) 345, a pass element 340 including a power transistor 341, and a feedback circuit (FC) 350.

In addition, the LDO regulator 300a may further include a compensation capacitor Cc. The compensation capacitor Cc is connected between an internal node of the error amplifier 310 and an output node NO21.

In FIG. 14, a load 360 and a load capacitor CL which are connected between the output node NO21 and the ground voltage VSS are also illustrated. The load capacitor CL is connected between the output node NO21 and the ground voltage VSS in parallel with respect to the load capacitor CL. The load 360 may include a load resistor RL.

The error amplifier 310 may be connected between the power supply voltage VDD1 and the ground voltage VSS, may receive a reference voltage VREF and a feedback voltage VFB2, may compare the reference voltage VREF and the feedback voltage VFB2, may amplify a difference between the reference voltage VREF and the feedback voltage VFB2 based on the comparison to generate a first error voltage EV1 corresponding to the difference and may output the first error voltage EV1 to the buffer 345.

The first error voltage EV1 may correspond to the difference between the reference voltage VREF and the feedback voltage VFB2. The error amplifier 310 has a positive (+) input terminal to receive the reference voltage VREF and a negative (−) input terminal to receive the feedback voltage VFB2.

The buffer 345 may buffer the first error voltage EV1 and may output a second error voltage EV2 to a gate of the power transistor 341. The buffer 345 may have a gain of −1.

The power transistor 341 may have a gate receiving the second error voltage EV2, and may regulate the power supply voltage VDD1 based on the second error voltage EV2 to provide the output voltage VOUT1 to the output node NO21. A load current IL corresponding to the output voltage VOUT lis provided to the load 360 from the output node NO21.

The power transistor 341 has a source coupled to the power supply voltage VDD1, a gate to receive the second error voltage EV2 and a drain coupled to the output node NO21. When the load current IL increases, a voltage level of the output voltage VOUTI decreases and a voltage level of the first error voltage EV1 increases. A voltage level of the second error voltage EV2 decreases in response to the level of the first error voltage EV1 increasing. When the voltage level of the second error voltage EV2 decreases, the voltage level of the output voltage VOUT1 increases.

When the load current IL decreases, the voltage level of the output voltage VOUT1 increases and the voltage level of the first error voltage EV1 decreases. The voltage level of the second error voltage EV2 increases in response to the voltage level of the first error voltage EV1 decreasing. When the voltage level of the second error voltage EV2 increases, the voltage level of the output voltage VOUT1 decreases.

Therefore, when the load current IL increases, the voltage level of the second error voltage EV2 decreases and when the load current IL decreases, the voltage level of the second error voltage EV2 increases.

The feedback circuit 350 may be connected between the output node NO21 and the ground voltage VSS, may generate the feedback voltage VFB2 by dividing the output voltage VOUT1 and may provide the feedback voltage VFB2 to the error amplifier 310.

Figure 15:
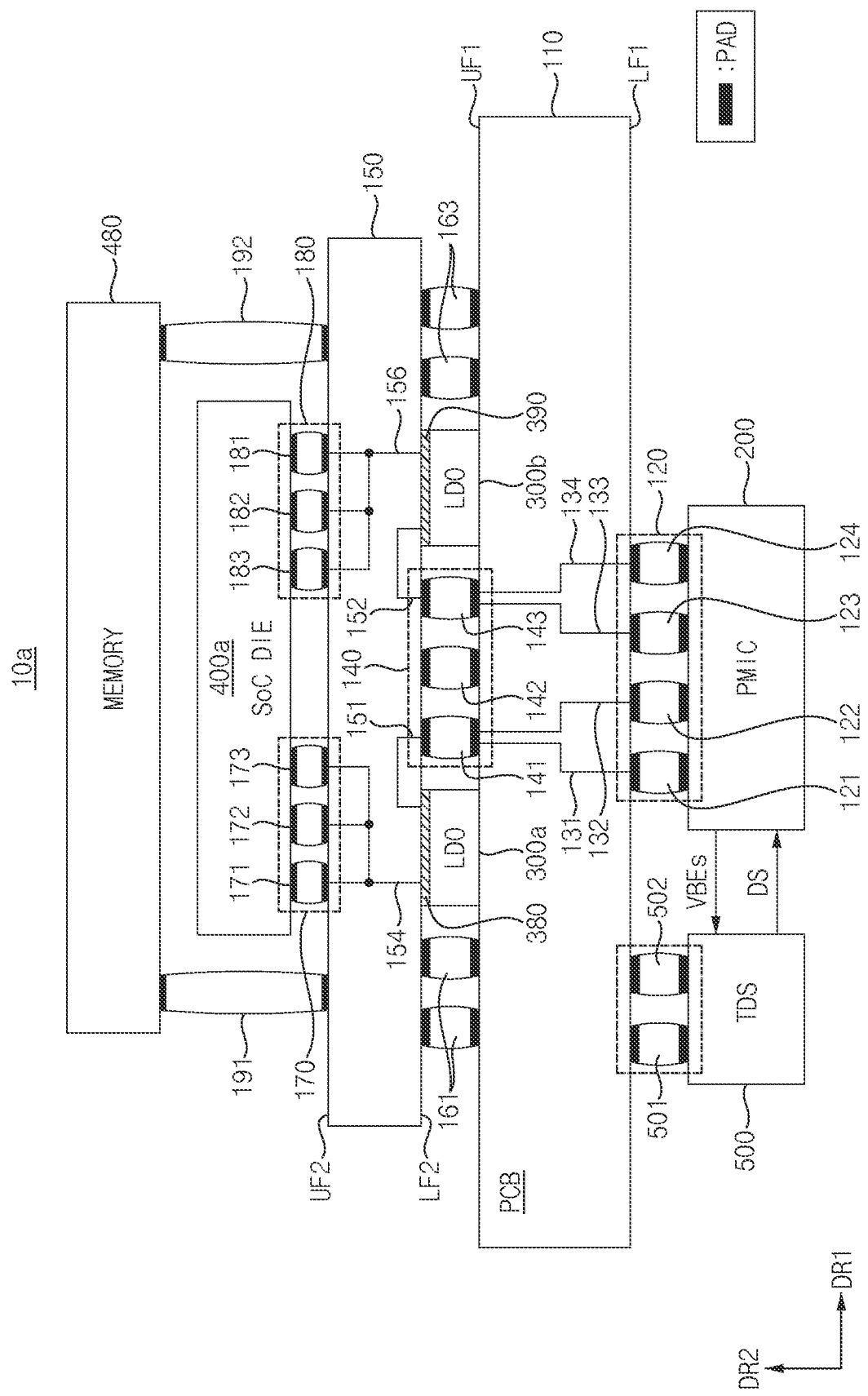
FIG. 15 is a block diagram illustrating an example of an electronic device.

FIG. 15 is a block diagram illustrating an example of an electronic device.

Referring to FIG. 15, an electronic device 10a may be a mobile device and the mobile device may be implemented with any computing device or any mobile/portable device, such as a mobile phone, a smart phone, a tablet computer, a laptop computer, a personal digital assistants (PDA), an enterprise digital assistant (EDA), a portable multimedia player (PMP), a digital camera, a portable game console, a music player, a camcorder, a video player, a navigation device, a wearable device, an internet of things (IoT) device, an internet of everything (IoE) device, an e-book, a virtual reality (VR) device, an augmented reality (AR) device, a robotic device, etc.

The electronic device 10a may include a printed circuit board (PCB) 110 and a plurality of (electronic) components disposed on the PCB 110.

The PCB 110 may have a first side UF1 and a second side LF1 opposed to the first side UF1. The components may be disposed on or above at least one of the first side UF1 and the second side LF1 of the PCB 110. The components may include at least one power management integrated circuit (PMIC) die, passive components and/or a plurality of low drop-out (LDO) regulators.

Throughout the specification, a first side may refer to a front side or a front surface and a second side may refer to a rear side or a rear surface.

The PCB 110 may include electrical (electrically) (conductive) paths along which at least one component mounted on and attached to the first side UF1 of the PCB 110 and at least one component mounted on and attached to the second side LF1 of the PCB 110 are electrically connected. For example, operating voltages (power and/or ground) and signals are transmitted along the electrical paths.

The PCB 110 may refer to a circuit board or a substrate which is capable of providing electrical paths (or, electrical communication paths) between at least one component mounted on and attached to the first side UF1 of the PCB 110 and at least one component mounted on and attached to the second side LF1 of the PCB 110.

To this end, the PCB 110 or 110a may include one or more dielectric material (insulating) layers, a plurality of metal (wiring) layers separated from each other by the dielectric material (insulating) layer(s), and conductive vias extending through the dielectric material layer(s) and electrically connecting the metal (wiring) layers to each other.

The electronic device 10a may further include a PMIC 200, a package substrate 150, a plurality of LDO regulators 300a and 300b, an integrated circuit (IC) die (SoC die) 400a, the memory 480 and the time division sensing circuit 500.

The package substrate 150 may be attached to the first side UF1 of PCB 110 by first interconnects 140, 161 and 163. The package substrate 150 may have a first side UF2 and a second side LF2 opposed to the first side UF2.

Each of the first interconnects 140, 161 and 163 may include at least one of a conductive pad or land of conductive material such as copper, a pin, and a solder bump (ball or the like of solder), but are not limited thereto.

Through the specification, the interconnect may include a ball and pads attached to both sides of the ball.

The plurality of LDO regulators 300a and 300b may be attached to the second side LF2 of the package substrate 150 and may be disposed among the first interconnects 140, 161 and 163. High density capacitors 380 and 390 may be disposed between the second side LF2 of the package substrate 150 and the plurality of LDO regulators 300a and 300b. The high density capacitors 380 and 390 may be referred to as landside capacitors because the high density capacitors 380 and 390 are attached to the second side (i.e., a landside) LF2 of the package substrate 150.

For example, the LDO regulator 300a and the high density capacitor 380 may be fabricated through a same process or may be sequentially stacked. The LDO regulator 300b and the high density capacitor 390 may be fabricated through a same process or may be sequentially stacked.

The PMIC 200 may be attached to the second side LF1 of the PCB 110 by second interconnects 120. The second interconnects 120 may include at least one of a conductive pad or land of conductive material such as copper, a pin, and a solder bump (ball or the like of solder), but are not limited thereto.

The IC die 400a may be attached to the first side UF2 of the package substrate 150 by third interconnects 170 and 180. The third interconnects 170 and 180 may include at least one of a conductive pad or land of conductive material such as copper, a pin, and a solder bump (ball or the like of solder), but are not limited thereto. The IC die 400a may include at least one of a microprocessor, a graphics processor, a signal processor, a network processor, a chipset, an application processor, a modem IC, a radio frequency (RF) IC, a flash memory, and a system on chip (SoC).

The memory 480 may be attached to the first side UF2 of the package substrate 150 by fourth interconnects 191 and 192 and the memory 480 may lie over the IC die 400a. The fourth interconnects 191 and 192 may include at least one of a conductive pad or land of conductive material. The memory 480 may include at least one of a dynamic random access memory (DRAM) device and a NAND flash memory device including a controller.

The first interconnects 140 may include first balls 141, 142 and 143 and the second interconnects 120 may include second balls 121, 122, 123 and 124. The third interconnects 170 may include balls 171, 172 and 173 and the third interconnects 180 may include balls 181, 182 and 183.

The PCB 110 may include first electrical paths 131, 132, 133 and 134 which connect the PMIC 200 to the LDO regulators 300a and 300b through the second interconnects 120 and the first interconnects 140 and the package substrate 150 may include second electrical paths 151, 152, 154 and 156 which connect the LDO regulators 300a and 300b to the IC die 400a through the first interconnects 140 and the third interconnects 170 and 180.

The electrical paths 151 and 152 among the second electrical paths 151, 152, 154 and 156 may be referred to first branch paths because the electrical paths 151 and 152 couple the balls 141 and 143 of the first interconnects 140 to the LDO regulators 300a and 300b. The electrical paths 154 and 156 among the second electrical paths 151, 152, 154 and 156 may be referred to second branch paths because the electrical paths 154 and 156 couple the LDO regulators 300a and 300b to the third interconnects 170 and 180.

The PMIC 200 generates a plurality of power supply voltages, may provide the power supply voltages to the LDO regulator 300a through the second balls 121 and 122, the ball 141 and the electrical path 151 and may provide the power supply voltages to the LDO regulator 300b through the second balls 123 and 123, the ball 143 and the electrical path 152.

In addition, the PMIC 200 may include a plurality of voltage devices which are disposed and distributed in the PMIC 200 as described with reference to FIG. 2A or FIG. 2B. The plurality of voltage devices may generate a plurality of temperature voltages VBEs which are inversely proportional to an ambient temperature and may provide the temperature voltages VBEs to the time division sensing circuit 500. Although not illustrated, the PMIC 200 may provide the temperature voltages VBEs to the time division sensing circuit 500 through the second interconnects 120.

The time division sensing circuit 500 may convert the temperature voltages VBEs to sensed voltages, may generate a decision signal DS indicating that at least one of the sensed voltages is equal to or smaller than a reference voltage based on a result of comparing each of the sensed voltages with the reference voltage by a time division scheme and may provide the decision signal DS to the PMIC 200.

The time division sensing circuit 500 may be attached to the second side LF1 of the PCB 110 through interconnects 501 and 502.

The LDO regulator 300a may generate an output voltage based on the received power supply voltage and may provide the generated output voltage to a corresponding power domain of the IC die 400a through the high density capacitor 380, the electrical path 154 and the balls 171, 172 and 173. The LDO regulator 300b may generate an output voltage based on the received power supply voltage and may provide the generated output voltage to a corresponding power domain of the IC die 400a through the high density capacitor 390, the electrical path 156 and the balls 181, 182 and 183.

Each of the PCB 110 and the package substrate 150 may have a corresponding length extending in a first direction DR1 and a corresponding thickness extending in a second direction DR2. The PMIC 200, the PCB 110, the LDO regulators 300a and the 300b, the IC die 400a and the memory 480 may be arranged in the second direction DR2.

Figure 16:
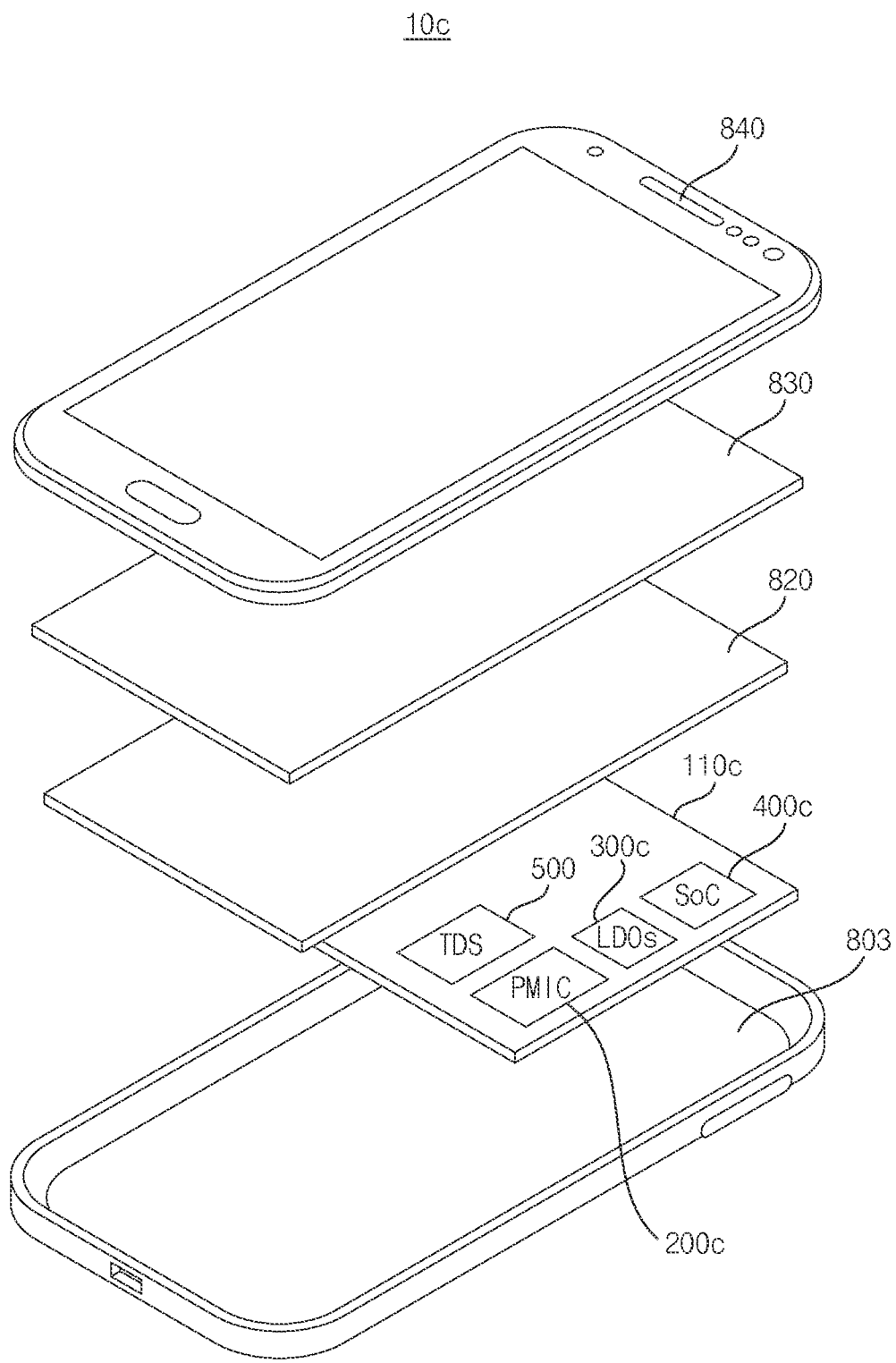
FIG. 16 is an exploded perspective view of an example of a mobile device.

FIG. 16 is an exploded perspective view of an example of a mobile device.

Referring to FIG. 16, a mobile device (i.e., an electronic device) 10c may include a housing 803, a PCB 110c, a display module 820, a touch sensing panel 830, and a window cover glass 840.

A smart-phone is exemplarily illustrated as the mobile device 10c in FIG. 16. However, the mobile device 10c is not limited to the smart-phone and may include one of various information supply devices such as a navigation device, a computer monitor, a tablet personal computer (PC), etc.

The housing 803 may accommodate internal components of the mobile device 10c. FIG. 16 exemplarily illustrates that the housing 803 is formed by one component but the housing 803 may be formed by combining at least two components. The housing 803 that is formed by one component will be exemplarily described in FIG. 16. In some implementations, the housing 803 may accommodate a power source unit (not shown) such as a battery according to a type of a display panel.

An SoC 400c that processes data using an application program and a PMIC 200c that generates power supply voltages based on a battery voltage, LDO regulators LDOs 300c which generate output voltages provided to the SoC 400c based on the power supply voltages and a time division sensing circuit 500 may be installed on the PCB 110c. The SoC 400c may correspond to the SoC 400 in FIG. 12.

For example, the PMIC 200c may be attached to a second side of the PCB 110c, the LDO regulators 300c may be attached to a second side of a package substrate attached to a first side of the PCB 110c by first interconnects and the SoC 400c may be attached to a first side of the package substrate. The LDO regulators 300c may be disposed between the first interconnects and may provide a corresponding output voltage to respective one of power domains of the SoC 400c.

In addition, the PMIC 200c may include a plurality of voltage devices which are disposed and distributed in the PMIC 200c. The plurality of voltage devices may generate a plurality of temperature voltages which are inversely proportional to an ambient temperature and may provide the temperature voltages to the time division sensing circuit 500.

The time division sensing circuit 500 may convert the temperature voltages to sensed voltages, may generate a decision signal indicating that at least one of the sensed voltages is equal to or smaller than a reference voltage based on a result of comparing each of the sensed voltages with the reference voltage by a time division scheme and may provide the decision signal to the PMIC 200c.

The display module 820 may display an image. A type of the display module 820 is not particularly limited and may be one of various display panels, e.g., an organic light-emitting display panel, a liquid crystal display panel, a plasma display panel, and an electro-wetting display panel, etc.

The touch sensing panel 830 may be an input unit of the display module 820 and may receive a touch signal. In some implementations, the touch sensing panel 830 may be embodied in an electrostatic capacitance touch panel.

The window cover glass 840 may be disposed on the touch sensing panel 830, combined with the housing 803, and included in an outside surface of the mobile device 10c together with the housing 803.

Although not shown in FIG. 16, the mobile device 10c may include various other components such as a wireless communication unit that establishes wireless communication, a memory unit (e.g., volatile memory/non-volatile memory) that stores data, a microphone, a speaker, and an audio processor.

Figure 17:
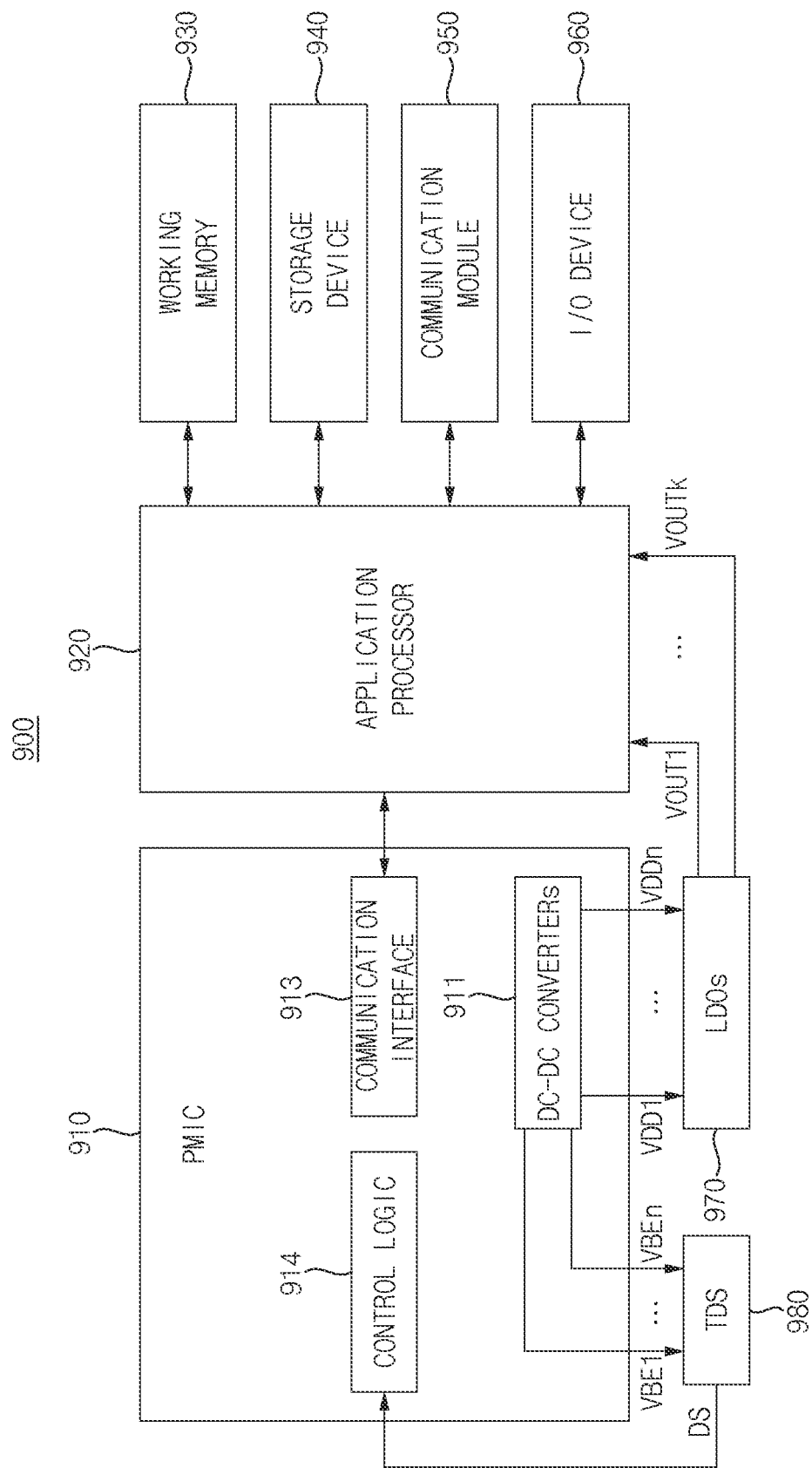
FIG. 17 is a block diagram illustrating an example of a mobile device.

FIG. 17 is a block diagram illustrating an example of a mobile device.

Referring to FIG. 17, a mobile device (i.e., an electronic device) 900 may be implemented with an electronic device capable of using or supporting an interface protocol proposed by the mobile industry processor interface (MIPI) alliance. The mobile device 900 may include an application processor 920, a working memory 930, a storage device 940, a communication module 950, an I/O device 960, a PMIC 910, a time division sensing circuit 980, and a plurality of LDO regulators LDOs 970.

The application processor 920 may control the components 910, 930, 940, 950, 960 and 970. The working memory 930 may temporarily store data processed or to be processed by the application processor 920. The storage device 940 may semi-permanently store data processed or to be processed by the application processor 920.

The communication module 950 may communicate with an external device based on various communication protocols such as world interoperability for microwave access (Wimax), wireless local area network (WLAN), ultra wide-band (UWB), long term evolution (LTE), global system for mobile communications (GSM), code division multiple access (CDMA), Bluetooth, near field communication (NFC), wireless fidelity (Wi-Fi), radio frequency identification (RFID), transfer control protocol/Internet protocol (TCP/IP), USB, SCSI, mobile PCIe (M-PCIe), and Firewire. The I/O device 960 may include a keyboard, a mouse, a key pad, a button, a touch panel, a touchscreen, a touch pad, a touch ball, a microphone, a gyroscope sensor, a vibration sensor, a liquid crystal display (LCD) device, a light-emitting diode (LED) display device, an organic LED (OLED) display device, an active matrix OLED (AMO-LED) display device, a speaker, a motor, an image sensor, a depth sensor, a camera, a display, an antenna, and so on.

The PMIC 910 may include DC-DC converters 911, a communication interface 913 and a control logic 914. Each of the DC-DC converters 911 may generate respective one of power supply voltages VDD1~VDDn based on a battery voltage, and the DC-DC converters 911 may provide the power supply voltages VDD1~VDDn to the LDO regulators 970.

The LDO regulators 970 may generate output voltages VOUT1~VOUTk based on the power supply voltages VDD1~VDDn and may provide the output voltages VOUT1~VOUTk to the components 920, 930, 940, 950 and 960. The control logic 914 may control the DC-DC converters 911 based on the DVFS performed by the application processor 920. The communication interface 913 may communicate with the application processor 920.

Each of a plurality of voltage devices which are disposed in respective one of the DC-DC converters 911 or may be adjacent to respective one of the DC-DC converters 911. The plurality of voltage devices may generate a plurality of temperature voltages VBE1, VBE2, ..., VBEn which are inversely proportional to an ambient temperature and may provide the temperature voltages VBE1, VBE2, ..., VBEn to the time division sensing circuit 980.

The time division sensing circuit 980 may convert the temperature voltages VBE1, VBE2, ..., VBEn to sensed voltages, may generate a decision signal DS indicating that at least one of the sensed voltages is equal to or smaller than a reference voltage based on a result of comparing each of the sensed voltages with the reference voltage by a time division scheme and may provide the decision signal DS to the PMIC 910.

The time division sensing circuit 980 may employ one of the time division sensing circuit 500a in FIG. 3, the time division sensing circuit 500c of FIG. 9 and the time division sensing circuit 500d of FIG. 11.

Figure 18:
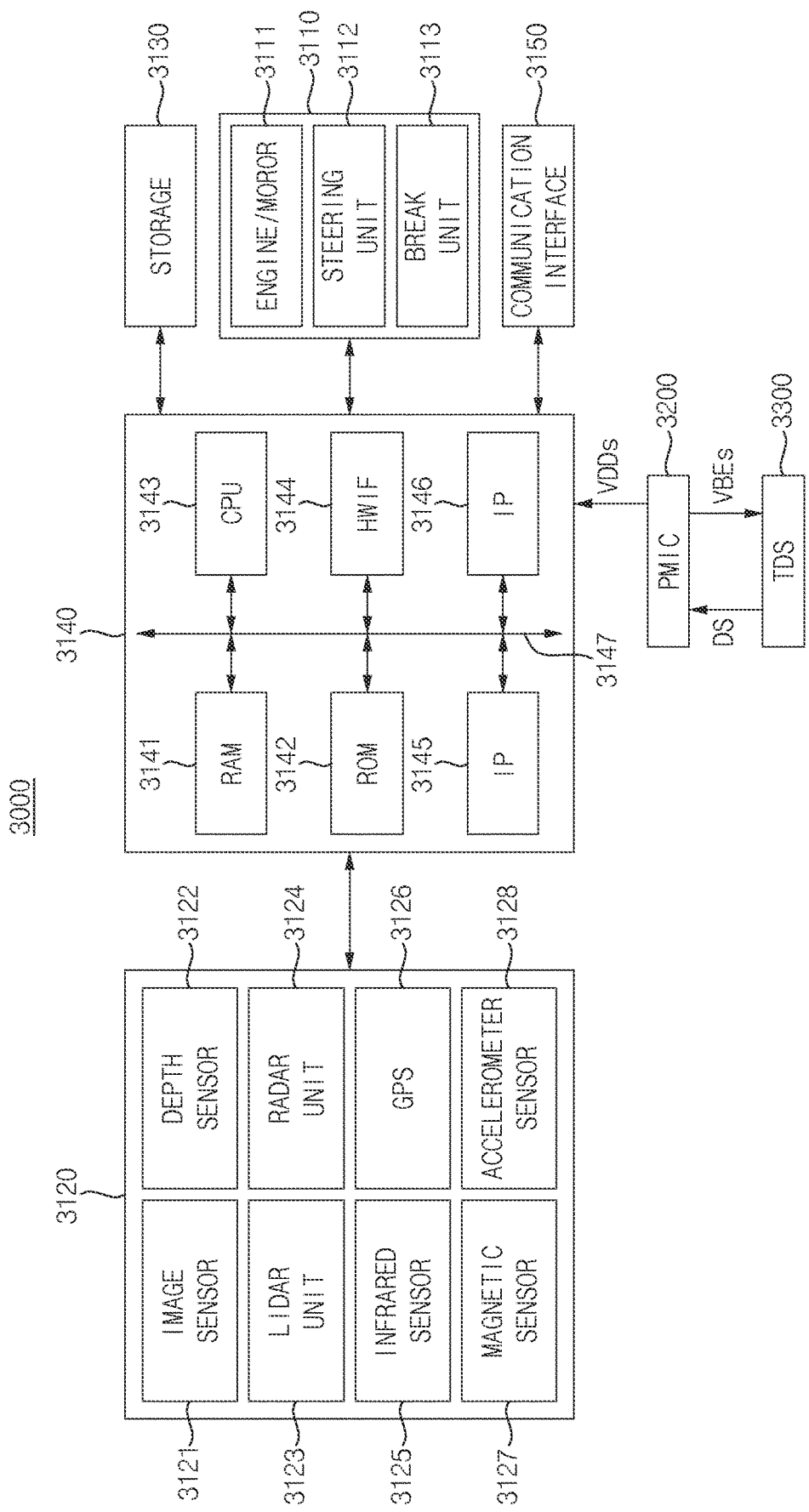
FIGS. 18 and 19 are diagrams illustrating an example of an autonomous driving system.
Figure 19:
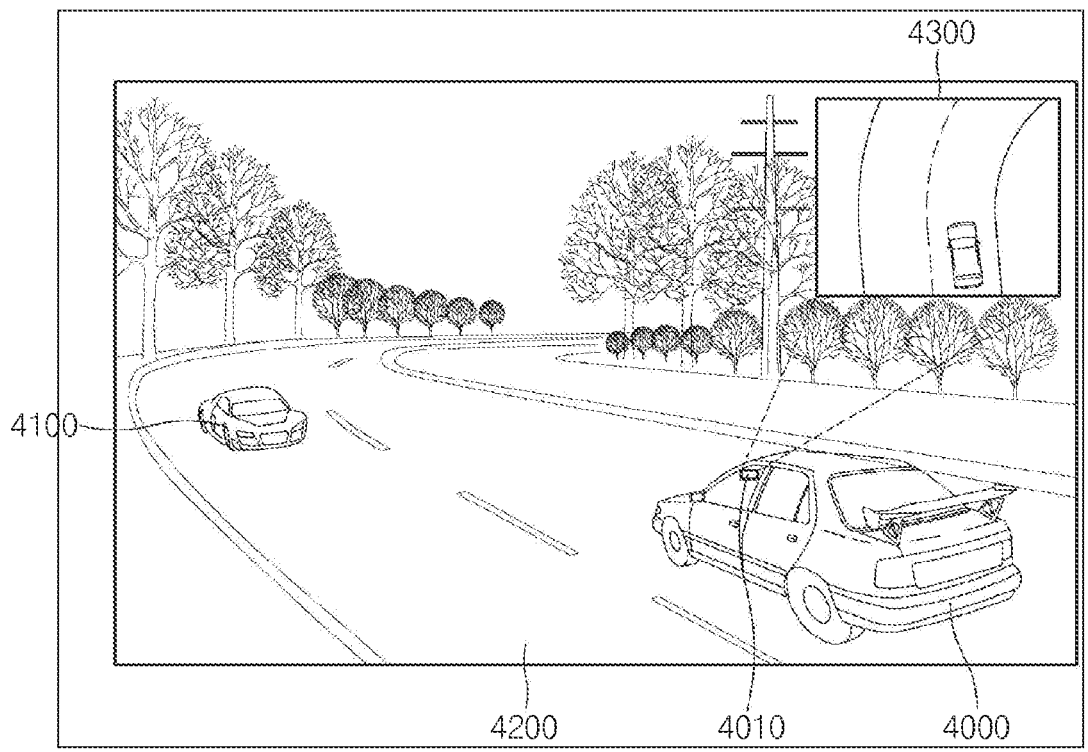

FIGS. 18 and 19 are diagrams illustrating an example of an autonomous driving system.

Referring to FIG. 18, an autonomous driving system 3000 may include a driver (e.g., including circuitry) 3110, a sensor 3120, a storage 3130, a controller (e.g., including processing circuitry) 3140, a communication interface 3150, a PMIC 3200, and a time division sensing circuit 3300.

The driver 3110 may, for example, be a configuration for driving the autonomous driving system 3000 and may include various circuitry. When the autonomous driving system 3000 is implemented with an autonomous vehicle, the driver 3110 may include various circuitry and/or components, such as, for example, an engine/motor 3111, a steering unit 3112, a brake unit 3113, and/or the like.

The sensor 3120 may include a number of sensors configured to sense information relating to a surrounding environment of the autonomous driving system 3000. For example, the sensor 3120 may include at least one of an image sensor 3121, a depth sensor 3122, a light detection and ranging (LIDAR) unit 3123, a radio detection and ranging (RADAR) unit 3124, an infrared sensor 3125, a global positioning system (GPS) 3126, a magnetic sensor 3127, and/or an accelerometer sensor 3128.

The controller 3140 may include a random access memory (RAM) 3141, a read-only memory (ROM) 3142, a central processing unit (CPU) 3143, a hardware interface device (HWIF) 3144, a plurality of intellectual property protected devices (IPs) 3145 and 3146, and a bus 3147. The storage 3130 may store data necessary for the controller 3140 to execute various processes. The communication interface 3150 may include various communication circuits and may be configured to facilitate communication between the autonomous driving system 3000 and an external device.

The PMIC 3200 may provide power supply voltage VDDs to the controller 3140.

The PMIC 3200 may include a plurality of voltage devices which are disposed and distributed in the PMIC 3200. The plurality of voltage devices may generate a plurality of temperature voltages VBEs which are inversely proportional to an ambient temperature and may provide the temperature voltages VBEs to the time division sensing circuit 3300.

The time division sensing circuit 3300 may convert the temperature voltages VBEs to sensed voltages, may generate a decision signal DS indicating that at least one of the sensed voltages is equal to or smaller than a reference voltage based on a result of comparing each of the sensed voltages with the reference voltage by a time division scheme and may provide the decision signal DS to the PMIC 3200.

The time division sensing circuit 3300 may employ one of the time division sensing circuit 500a in FIG. 3, the time division sensing circuit 500c of FIG. 9 and the time division sensing circuit 500d of FIG. 11.

Referring to FIG. 19, an autonomous driving system 4010 may be installed in an autonomous vehicle 4000. For example, the autonomous driving system 4010 may detect a road 4200 including a fixed pattern and another vehicle 4100 moving in time, by analyzing the at least one image sequence 4300 received from cameras.

The present disclosure may be applied to a PMIC, an SoC, and various devices and systems including the PMIC and the SoC, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, a wearable device, an IoT device, an IoE device, an e-book, a VR device, an AR device, a robotic device, etc. . . .

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

While the present disclosure has been particularly shown and described with reference to the example implementations thereof, it will be understood by those of ordinary skill in the art that various changes in form and detail may be made therein without departing from the spirit and scope of the present disclosure as defined by the following claims.

What is claimed is:

1. An electronic device comprising:
  a power management integrated circuit (PMIC) including a plurality of direct current (DC)-DC converters, the plurality of DC-DC converters configured to generate a plurality of power supply voltages, respectively, based on a battery voltage;
  a plurality of voltage devices distributed in the PMIC, the plurality of voltage devices configured to generate a plurality of temperature voltages that are inversely proportional to an ambient temperature; and
  a time division sensing circuit configured to:
    convert the plurality of temperature voltages to a plurality of sensed voltages;
    generate a decision signal based on a result of comparing each of the plurality of sensed voltages with a reference voltage by a time division scheme during a sensing period, wherein the decision signal indicates that at least one sensed voltage of the plurality of sensed voltages is equal to or small than the reference voltage; and
    provide the decision signal to the PMIC, and
  wherein the PMIC is configured to perform a thermal shutdown on at least one of the plurality of DC-DC converters in response to the decision signal indicating that the at least one sensed voltage of the plurality of sensed voltages is equal to or smaller than the reference voltage.

2. The electronic device of claim 1, wherein the plurality of voltage devices include a plurality of bipolar junction transistors (BJTs),
  wherein each BJT of the plurality of BJTs is disposed in a respective DC-DC converter of the plurality of DC-DC converters or disposed adjacent to the respective DC-DC converter of the plurality of DC-DC converters, and
  wherein each BJT of the plurality of BJTs includes:
    an emitter coupled to a ground voltage;

a collector coupled to the time division sensing circuit, the collector configured to provide a corresponding temperature voltage from the plurality of temperature voltages; and a base coupled to the collector.

3. The electronic device of claim 2, wherein each of the plurality of BJTs is configured to provide a complementary to absolute temperature (CTAT) voltage as the corresponding temperature voltage at the collector, and wherein the CTAT voltage decreases as the ambient temperature increases.

4. The electronic device of claim 1, wherein the time division sensing circuit includes:

a plurality of sensing circuits configured to convert the plurality of temperature voltages to the plurality of sensed voltages, respectively;

a multiplexer configured to provide a selected voltage by sequentially selecting the plurality of sensed voltages in response to first timing control signals;

a comparator configured to generate a comparison signal by comparing the selected voltage with the reference voltage;

a latch configured to provide the decision signal by latching the comparison signal based on second timing control signals; and a controller configured to generate the first timing control signals and the second timing control signals based on a clock signal.

5. The electronic device of claim 4, wherein each sensing circuit of the plurality of sensing circuits includes:

a current source coupled between a power supply voltage and a first node, the current source configured to provide a reference current to the first node; and a variable resistor that includes a first terminal and a second terminal, the first terminal coupled to the first node and the second terminal receiving one of the plurality of temperature voltages, and wherein each of the plurality of sensing circuits is configured to provide the sensed voltage to the multiplexer at the first node.

6. The electronic device of claim 5, wherein each of the plurality of sensing circuits is configured to provide a voltage as the sensed voltage, and wherein the voltage corresponds to a sum of a corresponding temperature voltage of the plurality of temperature voltages and a result of multiplication of the reference current and a resistance value of the variable resistor.

7. The electronic device of claim 5, wherein the controller is configured to provide each variable resistor with a first trimming control code associated with compensating for resistance value mismatch due to process variance of the variable resistor.

8. The electronic device of claim 7, wherein the controller is configured to provide each current source with a second trimming control code associated with compensating for reference current mismatch due to process variance of the current source.

9. The electronic device of claim 4, wherein the controller is further configured to:

divide the sensing period into a plurality of sub sensing periods; and activate each of the first timing control signals and each of the second timing control signals in each of the plurality of sub sensing periods, and wherein each of the first timing control signals has a first activation interval and each of the second timing control signals has a second activation interval smaller than the first activation interval.

10. The electronic device of claim 9, wherein the controller is configured to determine the second activation interval by eliminating a debounce interval from the first activation interval.

11. The electronic device of claim 9, wherein the multiplexer is configured to provide the selected voltage by sequentially selecting the plurality of sensed voltages that decrease linearly in the first activation interval of each of the plurality of sub sensing periods, and wherein the latch is configured to provide the decision signal by latching the comparison signal in the second activation interval of each of the plurality of sub sensing periods.

12. The electronic device of claim 4, wherein the time division sensing circuit further includes:

an oscillator configured to generate the clock signal; and a reference voltage generator configured to generate the reference voltage.

13. The electronic device of claim 1, wherein the plurality of voltage devices include a plurality of diodes, wherein each of the plurality of diodes is disposed in a respective DC-DC converter of the plurality of DC-DC converters or disposed adjacent to the respective DC-DC converter of the plurality of DC-DC converters, and wherein each of the plurality of diodes includes:

a cathode coupled to a ground voltage; and an anode coupled to the time division sensing circuit, the anode configured to provide a corresponding temperature voltage from the plurality of temperature voltages.

14. The electronic device of claim 13, wherein each of the plurality of diodes is configured to provide a complementary to absolute temperature (CTAT) voltage as the corresponding temperature voltage at the anode, and wherein the CTAT voltage decreases as the ambient temperature increases.

15. The electronic device of claim 1, further comprising:

an integrated circuit; and a plurality of low drop-out (LDO) regulators configured to generate a plurality of output voltages based on the plurality of power supply voltages and provide the plurality of output voltages to the integrated circuit, wherein the integrated circuit includes one of a microprocessor, a graphics processor, a signal processor, a network processor, a chipset, an application processor, a modem integrated circuit (IC), a radio frequency (RF) IC, a flash memory, and a system on chip (SoC), and wherein each of the plurality of DC-DC converters includes a buck converter.

16. An electronic device, comprising:

a power management integrated circuit (PMIC) including a plurality of direct current (DC)-DC converters, the plurality of DC-DC converters configured to generate a plurality of power supply voltages, respectively, based on a battery voltage;

a plurality of voltage devices distributed in the PMIC, the plurality of voltage devices configured to generate a plurality of temperature voltages that are inversely proportional to an ambient temperature; and a time division sensing circuit configured to:

convert the plurality of temperature voltages to a plurality of sensed voltages;

generate a first sub decision signal by comparing each of the plurality of sensed voltages with a reference voltage by a first time division scheme during a sensing period;

generate a second sub decision signal by comparing each of the plurality of sensed voltages with the reference voltage by a second time division scheme during the sensing period;

generate a decision signal, indicating that at least one sensed voltage of the plurality of sensed voltages is equal to or smaller than the reference voltage, based on the first sub decision signal and the second sub decision signal; and provide the decision signal to the PMIC, and wherein the PMIC is configured to perform a thermal shutdown on at least one of the plurality of DC-DC converters in response to the decision signal indicating that the at least one sensed voltage of the plurality of sensed voltages is equal to or smaller than the reference voltage.

17. The electronic device of claim 16, wherein the plurality of voltage devices include a plurality of bipolar junction transistors (BJTs), wherein each BJT of the plurality of BJTs is disposed in a respective DC-DC converter of the plurality of DC-DC converters or disposed adjacent to the respective DC-DC converter of the plurality of DC-DC converters, and wherein each BJT of the plurality of BJTs includes:
an emitter coupled to a ground voltage;
a collector coupled to the time division sensing circuit, the collector configured to provide a corresponding temperature voltage from the plurality of temperature voltages; and
a base coupled to the collector.

18. The electronic device of claim 16, wherein the time division sensing circuit includes:
a plurality of sensing circuits configured to convert the plurality of temperature voltages to the plurality of sensed voltages, respectively;
a first sub sensing circuit configured to generate the first sub decision signal based on the plurality of sensed voltages and the reference voltage;
a second sub sensing circuit configured to generate the second sub decision signal based on the plurality of sensed voltages and the reference voltage;
an OR gate configured to generate the decision signal based on the first sub decision signal and the second sub decision signal; and
a controller configured to control operation of the first sub sensing circuit and operation of the second sub sensing circuit by applying timing control signals, which are based on a clock signal, to the first sub sensing circuit and the second sub sensing circuit.

19. The electronic device of claim 18,
wherein the first sub sensing circuit includes:
a first multiplexer configured to provide a first selected voltage by sequentially selecting the plurality of sensed voltages in response to first timing control signals from the timing control signals;
a first comparator configured to generate a first comparison signal by comparing the first selected voltage with the reference voltage; and
a first latch configured to provide the first sub decision signal by latching the first comparison signal based on second timing control signals from the timing control signals, and wherein the second sub sensing circuit includes:
a second multiplexer configured to provide a second selected voltage by sequentially selecting the plurality of sensed voltages in response to third timing control signals from the timing control signals;
a second comparator configured to generate a second comparison signal by comparing the second selected voltage with the reference voltage; and
a second latch configured to provide the second sub decision signal by latching the second comparison signal based on fourth timing control signals from the timing control signals.

20. An electronic device, comprising:
a power management integrated circuit (PMIC) including a plurality of direct current (DC)-DC converters, the plurality of DC-DC converters configured to generate a plurality of power supply voltages, respectively, based on a battery voltage;
a plurality of voltage devices distributed in the PMIC, the plurality of voltage devices configured to generate a plurality of temperature voltages that are inversely proportional to an ambient temperature; and
a time division sensing circuit configured to:
convert the plurality of temperature voltages to a plurality of sensed voltages;
generate a decision signal based on a result of comparing each of the plurality of sensed voltages with a reference voltage by a time division scheme during a sensing period, wherein the decision signal indicates that at least one sensed voltage of the plurality of sensed voltages is equal to or small than the reference voltage; and
provide the decision signal to the PMIC,
wherein the PMIC is configured to perform a thermal shutdown on at least one of the plurality of DC-DC converters in response to the decision signal indicating that the at least one sensed voltage of the plurality of sensed voltages is equal to or smaller than the reference voltage,
wherein the plurality of voltage devices include a plurality of bipolar junction transistors (BJTs) or a plurality of diodes,
wherein each BJT of the plurality of BJTs or each of the plurality of diodes is disposed in a respective DC-DC converter of the plurality of DC-DC converters or disposed adjacent to the respective DC-DC converter of the plurality of DC-DC converters, and
wherein the time division sensing circuit includes:
a plurality of sensing circuits configured to convert the plurality of temperature voltages to the plurality of sensed voltages, respectively;
a multiplexer configured to provide a selected voltage by sequentially selecting the plurality of sensed voltages in response to first timing control signals;
a comparator configured to generate a comparison signal by comparing the selected voltage with the reference voltage;
a latch configured to provide the decision signal by latching the comparison signal based on second timing control signals; and
a controller configured to generate the first timing control signals and the second timing control signals based on a clock signal.

\* \* \* \* \*